United States Patent
Thirumalai et al.

(10) Patent No.: US 9,900,576 B2
(45) Date of Patent: *Feb. 20, 2018

(54) SIMPLIFICATIONS ON DISPARITY VECTOR DERIVATION AND MOTION VECTOR PREDICTION IN 3D VIDEO CODING

(71) Applicant: QUALCOMM Incorporated, San Diego, CA (US)

(72) Inventors: Vijayaraghavan Thirumalai, San Diego, CA (US); Li Zhang, San Diego, CA (US); Ying Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 219 days.

This patent is subject to a terminal disclaimer.

(21) Appl. No.: 14/216,232

(22) Filed: Mar. 17, 2014

(65) Prior Publication Data

US 2014/0267605 A1 Sep. 18, 2014

Related U.S. Application Data

(60) Provisional application No. 61/803,100, filed on Mar. 18, 2013, provisional application No. 61/807,281, filed on Apr. 1, 2013.

(51) Int. Cl.
*H04N 19/597* (2014.01)
*H04N 13/00* (2018.01)

(52) U.S. Cl.
CPC ....... *H04N 13/0048* (2013.01); *H04N 19/597* (2014.11)

(58) Field of Classification Search
CPC .................. H04N 13/0048; H04N 19/597
(Continued)

(56) References Cited

U.S. PATENT DOCUMENTS 8,982,183 B2  3/2015 Jeon
9,237,345 B2  1/2016 Kang et al.
(Continued)

FOREIGN PATENT DOCUMENTS

CN  102946535 A  2/2013
JP  2016506195 A  2/2016
(Continued)

OTHER PUBLICATIONS

Chang et al. "CE1.h: Depth-oriented Neighboring Block Disparity Vector (DoNBDV) with virtual depth retrieval", ITU-T SG 16 WP 3 and ISO/IEC JTC 1/SC 29/WG 11, 3rd Meeting: Geneva, Switzerland, Jan. 17-23, 2013, Document: JCT3V-C0131 (Chang).*
(Continued)

*Primary Examiner* — Jamie Atala
*Assistant Examiner* — Kathleen Nguyen

(57) ABSTRACT

A device for coding three-dimensional video data includes a video coder configured to determine a first block of a first texture view is to be coded using a block-based view synthesis mode; locate, in a depth view, a first depth block that corresponds to the first block of the first texture view; determine depth values of two or more corner positions of the first depth block; based on the depth values, derive a disparity vector for the first block; using the disparity vector, locate a first block of a second texture view; and, inter-predict the first block of the first texture view using the first block of the second texture view.

28 Claims, 11 Drawing Sheets

(58) Field of Classification Search
USPC .......................................................... 375/240
See application file for complete search history.

(56) References Cited

U.S. PATENT DOCUMENTS

| | | | |
|---|---|---|---|
| 9,319,657 B2 | 4/2016 | Kang | |
| 9,521,425 B2 | 12/2016 | Chen et al. | |
| 9,635,357 B2 | 4/2017 | Zhang et al. | |
| 2002/0101545 A1* | 8/2002 | Damstra | H04N 5/23203 348/726 |
| 2011/0012994 A1 | 1/2011 | Park et al. | |
| 2011/0293020 A1 | 12/2011 | Lim et al. | |
| 2012/0189060 A1 | 7/2012 | Lee et al. | |
| 2012/0224634 A1 | 9/2012 | Yamori | |
| 2014/0009574 A1* | 1/2014 | Hannuksela | H04N 19/00769 348/42 |
| 2014/0098883 A1 | 4/2014 | Hannuksela et al. | |
| 2014/0153645 A1 | 6/2014 | Zhang et al. | |
| 2014/0240456 A1 | 8/2014 | Kang et al. | |
| 2014/0241430 A1 | 8/2014 | Zhang et al. | |
| 2014/0241431 A1 | 8/2014 | Zhang et al. | |
| 2014/0269898 A1 | 9/2014 | Thirumalai et al. | |
| 2014/0314147 A1 | 10/2014 | Rusanovskyy et al. | |
| 2014/0341289 A1* | 11/2014 | Schwarz | H04N 19/597 375/240.16 |

FOREIGN PATENT DOCUMENTS

| | | |
|---|---|---|
| WO | 2012171442 A1 | 12/2012 |
| WO | 2014106496 A1 | 7/2014 |

OTHER PUBLICATIONS

Rusanovskyy et al., "CE1.a-related: Simplification of BVSP in 3DV-ATM", ITU-T SG 16 WP 3 and ISO/IEC JTC 1/SC 29/WG 11, 3rd Meeting: Geneva, Switzerland, Jan. 17-23, 2013, Document: JCT3V-C1069.*
Chang et al. "CE1.h: Depth-oriented Neighboring Block Disparity Vector (DoNBDV) with virtual depth retrieval", ITU-T SG 16 WP 3 and ISO/IEC JTC 1/SC 29/WG 11, 3rd Meeting: Geneva, Switzerland, Jan. 17-23, 2013, Document: JCT3V-00131 (Chang).*
Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 11-20, 2012, JCTVC-J1003_d7, 261 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 9," 11th Meeting: Shanghai, CN, Oct. 10-19, 2012, JCTVC-K1003_v7, 290 pp.
Bross et al., "WD4: Working Draft 4 of High-Efficiency Video Coding," 6th Meeting: JCTVC-F803_d2, Torino, IT, Jul. 14-22, 2011, 226 pp.
Bross et al., "WD5: Working Draft 5 of High-Efficiency Video Coding," 7th Meeting: Geneva, Switzerland, Nov. 21-30, 2011, JCTVC-G1103_d2, 214 pp.
Chang, et al., "3D-CE5.h related: Depth-oriented Neighboring Block Disparity Vector (DoNBDV) with virtual depth", JCT-3V Meeting; MPEG Meeting; Oct. 13-19, 2012; Shanghai; (The Joint Collaborative Team on 3D Video Coding Extension Development of ISO/IEC JTC1/SC29/WG11 and ITU-T SG.16); URL: http://phenix.int-evry.fr/JCT2, No. JCT3V-B0090, XP030130271, 5 pp.
International Search Report and Written Opinion from International Application No. PCT/US2014/031029, dated Dec. 23, 2014, 11 pp.

Zhang et al., "CE5.h: Disparity vector generation results," Joint Collaborative Team on 3D Video Coding Extension Development of ITU-T SG 16 WP 3 and ISO/IEC JTC 1/SC 29/WG 11, Document: JCT3V-A0097, Jul. 16-20, 2012, 5 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, High efficiency video coding, The International Telecommunication Union, Apr. 2013, 317 pages.
"ITU-T H.265, Series H: Audiovisual and Multimedia Systems, Infrastructure of audiovisual services—Coding of moving video, High efficiency video coding, The International Telecommunication Union, Oct. 2014, 540 pp."
Kang, et al, "3D-CE2.h related: Enhanced disparity vector derivation", JCT-3V Meeting; MPEG Meeting; Jan. 17-23, 2013; Geneva; (The Joint Collaborative Team on 3D Video Coding Extension Development of ISO/IEC JTC1/SC29/WG11 and ITU-T SG.16 ); URL: http://phenix.int-evry.fr/JCT2/,, No. JCT3V-C0050, XP030130466, 4 pp.
Lee, et al., "3D-CE2.h Related Results on Disparity Vector Derivation", JCT-3V Meeting; MPEG Meeting; Jan. 17-23, 2013; Geneva; (The Joint Collaborative Team on 3D Video Coding Extension Development of ISO/IEC JTC1/SC29/WG11 and ITU-T SG.16); URL: http://phenix.int-evry.fr/JCT2/ No. JCT3V-00097, 4 pp.
Tech, et al., "3D-HEVC Test Model 2," Joint Collaborative Team on 3D Video Coding Extension Development of ITU-T SG 16 WP 3 and ISO/IEC JTC 1/SC 29/WG 11, Oct. 13-19, 2012, Document: JCT3V-B1005_d0, 2nd Meeting: Shanghai, CN, XP030130414, 118 pp.
Wiegand et al., "WD1: Working Draft 1 of High-Efficiency Video Coding", JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Rusanovskyy, et al., "CE1.a-related: Simplification of BVSP in 3DV-ATM," Nokia Corporation, 3rd Meeting: Geneva, CH, URL: http://phenix.int-evry.fr/jct2/ No. JCT3V-C0169, Jan. 17-23, 2013, XP030130585, 2 pp.
Zheng, et al., "Disparity Estimation With Hierarchical Block Correlation for Stereoscopic Image Coding", Systems & Computers in Japan, Wiley, Hoboken, NJ, US, vol. 28, No. 6, Jun. 15, 1997, XP000723851, 8 pp.
Hannuksela, et al., "3D-AVC Draft Text 5," ITU-T SG 16 WP 3 and ISO/IEC JTC 1/SC 29/WG 11, Jan. 17-23, 2013, Document: JCT3V-C1002, 82 pp.
Tech, et al., "JCT-3V AHG report: MV-HEVC/3D-HEVC Test Model editing (AHG3)," ITU-T SG 16 WP 3 and ISO/IEC JTC 1/SC 29/WG 11, Oct. 13-19, 2012, Document: JCT3V-B0003, 4 pp.
Kang, et al., "3D-CE5.h related: Improvements for disparity vector derivation," ITU-T SG 16 WP 3 and ISO/IEC JTC 1/SC 29/WG 11, Oct. 13-19, 2012, Document: JCT3V-B0047, 4 pp.
Su, et al., "3DV-CE1.a: Block-based View Synthesis Prediction for 3DV-ATM," ITU-T SG 16 WP 3 and ISO/IEC JTC 1/SC 29/WG 11, Document: JCT2-A0107, Jul. 16-20, 2012, 5 pp.
Sung, et al., "3D-CE5.h: Simplification of disparity vector derivation for HEVC-based 3D video coding," ITU-T SG 16 WP 3 and ISO/IEC JTC 1/SC 29/WG 11, Document: JCT2-A0126, Jul. 16-20, 2012, 4 pp.
Tech, et al., "3D-HEVC Test Model 1," ITU-T SG 16 WP 3 and ISO/IEC JTC 1/SC 29/WG 11, Jul. 16-20, 2012, Document: JCT3V-A1005_d0, 83 pp.
Chang, et al., "CE1.h: Depth-Oriented Neighboring Block Disparity Vector (DoNBDV) with Virtual Depth Retrieval," Media Tek Inc., JCT3V-C0131, 3rd Meeting: Geneva, CH, Jan. 17-23, 2013, XP030056435, 5 pp.

(56) References Cited

OTHER PUBLICATIONS

Rusanovskyy, et al., "CE1.a-related: Simplification of BVSP in 3DV-ATM," Nokia Corporation, 3rd Meeting: Geneva, CH, URL: http://phenix.int-evry.fr/jct2/,, No. JCT3V-00169, Jan. 17-23, 2013, XP030130585, 2 pp.

Second Written Opinion from International Application No. PCT/US2014/031029, dated May 19, 2015, 5 pp.

Chen, et al., "3D-CE2.A related: MB-level depth-to-DV conversion in ATM," JCT3V-C0134, Joint Collaborative Team on 3D Video Coding Extension Development of ITU-T SG 16 WP 3 AND ISO/IEC JTC 1/SC 29/WG 11, 3rd Meeting: Geneva, CH, Jan. 17-23, 2013, 3 pp.

Bang, et al., "3D-CE2.A Results on Simplification on the Disparity Vector Derivation," JCT3V-C0122, Joint Collaborative Team on 3D Video Coding Extension Development of ITU-T SG 16 WP 3 and ISO/IEC JTC 1/SC 29/WG 11, 3rd Meeting: Geneva, CH, Jan. 17-23, 2013, 5 pp.

Zhang, et al., "3D-CE5.h related- Disparity vector derivation for multiview video and 3DV", MPEG Meeting, Apr. 30-May 4, 2012, Geneva, (Motion Picture Expert Group or ISO/IEC JTC29/WG11), No. m24937, May 1, 2012, XP030053280, 6 pp.

International Preliminary Report on Patentability from International Application No. PCT/US2014/031029, dated Aug. 7, 2015, 8 pp.

International Preliminary Report on Patentability from International Application No. PCT/US2014/031039, dated Aug. 7, 2015, 9 pp.

Second Written Opinion from International Application No. PCT/US2014/031029; dated May 19, 2015, 5 pp.

Response to Second Written Opinion dated May 19, 2015, from International Application No. PPCT/US2014/031029, filed on Jul. 17, 2015, 4 pp.

Thirumalai, et al., "CE2.a related: Simplifications on the disparity vector derivation in 3D-AVC", Apr. 20-26, 2013; Joint Collaborative Team on 3D Video Coding Extensions of ITU-T SG 16 WP 3 and ISO/IEC JTC 1/SC 29/WG 11, 4th Meeting: Incheon, KR, JCT3V-D0187, Apr. 13, 2013, 6 pp.

Chang et al., "3D-CE1.h: Depth-Oriented Neighboring Block Disparity Vector (DoNBDV) with Virtual Depth Retrieval", JCT-3V Meeting, MPEG Meeting, Jan. 17-23, 2013, Geneva, (The Joint Collaborative Team on 3D Video eroding Extension Development of ISO/IEC JTC1/SC29/WG11 and ITU-T SG.16 ), URL: http://phenix.int-evry.fr/JCT2/, No. JCT3V-C0131, Jan. 10, 2013, XP030130547, 5 pp.

Zhang, et al., "3D-CE5.h related: Disparity vector derivation for multiview video and 3DV", MPEG Meeting; Apr. 30-May 5, 2012; Geneva; (Motion Picture Expert Group or ISO/IEC JTC1/SC29/WG11), No. m24937, May 1, 2012 XP030053280, 6 pp.

Co-pending U.S. Appl. No. 14/215,876, filed Mar. 17, 2014.

Chang et al., "3D-CE2.h related: Simplified DV derivation for DoNBDV and BVSP," MPEG Meeting; Apr. 20-26, 2013; (The Joint Collaborative Team on 3D Video Coding Extension Development of ISO/IEC JTC1/SC29/WG11 and ITU-T SG.16 ); Apr. 13, 2013; Document: JCT3V-D0138, 4 pp.

Jung, et al., "3D-CE1.h related : Adaptive method for Depth-oriented Neighboring Block Disparity Vector," Jan. 17-23, 2013 Joint Collaborative Team on 3D Video Coding Extension Development of ITU-T SG 16 WP 3 and ISO/IEC JTC 1/SC 29/WG 11, 3rd Meeting: Geneva, CH, Document: JCT3V-C0112_r3, Jun. 2, 2016, 6 pp.

Rusanovskyy, et al., "Common Test Conditions of 3DV Core Experiments," Joint Collaborative Team on 3D Video eroding Extensions of ITU-T SG 13 WP 3 and ISO/IEC JTC 1/SC 29/WG11, Jan. 17-23, 2013, Document: JCT3V-C1100, Jan. 22, 2013, 5 pp.

Tech, et al., "3D-HEVC Test Model 3", JCT-3V Meeting; MPEG Meeting; Jan. 17-23, 2013; Geneva; (The Joint Collaborative Team on 3D Video Coding Extension Development of ISO/IEC JTC1/SC29/WG11 and ITU-T SG.16); URL: http://phenix.int-evry.fr/JCT2/, No. JCT3V-C1005_d0, Mar. 15, 2013, XP030130664, 52 pp.

Tian, et al.,"CE1.h: Backward View Synthesis Prediction using Neighbouring Blocks", JCT-3V Meeting; MPEG Meeting; Jan. 16-23, 2013; Geneva; (The Joint Collaborative Team on 3D Video Coding Extension Development of ISO/IEC JTC1/SC29/WG11 and ITU-T SG.16 ); URL: http://phenix.int-evry.fr/JCT2/,, No. JCT3V-00152, Jan. 10, 2013, XP030130568, 5 pp.

Su et al., "Block based View synthesis prediction for 3D-ATM," JCT-VC Meeting; MPEG Meeting; Jul. 16-20, 2012; Stockholm; (The Joint Collaborative Team on 3D Video Coding Extension Development of ISO/IEC JTC1/SC29/WG11 and ITU-T SG.16 ); Nokia, Jul. 10, 2012, 5 pp.

Zhang, et al., "Improvement on MV candidates for 3DVC—Mediatech," JCT Meeting; MPEG Meeting; Oct. 13-19, 2012; Shanghai; (The Joint Collaborative Team on 3D Video Coding Extension Development of ISO/IEC JTC1/SC29/WG11 and ITU-T SG.16 ); Oct. 9, 2012, 12 pp.

Chang Y-L., et al., "CE5.h: Depth-Oriented Neighboring Block Disparity Vector (DoNBDV) with Virtual Depth Retrieval," 103. MPEG Meeting; Jan. 21, 2013-Jan. 25, 2013; Geneva; (Motion Picture Expert Group or ISO/IEC JTC1/SC29/WG11), No. m27882, Jan. 17, 2013 (Jan. 17, 2013), XP030056435 (5 pages).

Lin J-L., et al., "3D-CE5.a related: Simplification on the Disparity Vector Derivation for AVC-based 3D Video Coding," 1. JCT-3V Meeting; 101. MPEG Meeting; Jul. 16, 2012-Jul. 20, 2012; Stockholm; (The Joint Collaborative Team on 3D Video Coding Extension Development of ISO/IEC JTC1/SC29/WG11 and ITU-T SG.16); URL: http://phenix.int-evry.fr/JCT2/, No. JCT3V-A0046, Jul. 10, 2012 (Jul. 10, 2012), 3 Pages, XP030130045.

Hannuksela, Miska M. et al., "3D-AVC Test Model 4," Document: JCT3V-B1003, JCT on Video Coding Extension Development of ITU-T SG 16 WP 3 and ISO/IEC JTC 1/SC29/WG11, 2nd Meeting, Shanghai, CN, Oct. 13-19, 2012 (25 pages).

Rusanovskyy D., et al., "3D-AVC Test Model 5", Joint Collaborative Team on 3D Video Coding Extension Development of ITU-T SG 16 WP 3 and ISO/IEC JTC 1/SC 29/WG 11, Mar. 11, 2013, [JCT3V-C1003] (Version 2).

\* cited by examiner

170

| 172C | | | | | | | 172D |
|---|---|---|---|---|---|---|---|
| | | | | | | | |
| | | | | | | | |
| | | | | | | | |
| | | | | | | | |
| | | | | | | | |
| | | | | | | | |
| 172A | | | | | | | 172B |

FIG. 7

SIMPLIFICATIONS ON DISPARITY VECTOR DERIVATION AND MOTION VECTOR PREDICTION IN 3D VIDEO CODING

This application claims the benefit of U.S. Provisional Application No. 61/803,100 filed 18 Mar. 2013; U.S. Provisional Application No. 61/807,281 filed 1 Apr. 2013, the entire contents each of which are incorporated by reference herein.

TECHNICAL FIELD

This disclosure relates to video encoding and decoding.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, to transmit, receive and store digital video information more efficiently.

Extensions of some of the aforementioned standards, including H.264/AVC, may provide techniques for multiview video coding in order to produce stereo or three-dimensional ("3D") video. In particular, techniques for multiview coding have been proposed for use in AVC, with the scalable video coding (SVC) standard (which is the scalable extension to H.264/AVC), and the multi-view video coding (MVC) standard (which has become the multiview extension to H.264/AVC).

Typically, stereo video is achieved using two views, e.g., a left view and a right view. A picture of the left view can be displayed substantially simultaneously with a picture of the right view to achieve a three-dimensional video effect. For example, a user may wear polarized, passive glasses that filter the left view from the right view. Alternatively, the pictures of the two views may be shown in rapid succession, and the user may wear active glasses that rapidly shutter the left and right eyes at the same frequency, but with a 90 degree shift in phase.

SUMMARY

In general, this disclosure describes techniques for 3D video coding. In particular, this disclosure is related to techniques for deriving disparity vectors.

In one example, a method of coding 3D video data includes determining a first block of a first texture view is to be coded using a block-based view synthesis mode; locating, in a depth view, a first depth block that corresponds to the first block of the first texture view; determining depth values of two or more corner positions of the first depth block; based on the depth values, deriving a disparity vector for the first block; using the disparity vector, locating a first block of a second texture view; and, inter-predicting the first block of the first texture view using the first block of the second texture view.

In another example, a device for coding 3D video data includes a video coder configured to determine a first block of a first texture view is to be coded using a block-based view synthesis mode; locate, in a depth view, a first depth block that corresponds to the first block of the first texture view; determine depth values of two or more corner positions of the first depth block; based on the depth values, derive a disparity vector for the first block; using the disparity vector, locate a first block of a second texture view; and, inter-predict the first block of the first texture view using the first block of the second texture view.

In another example, a device for coding 3D video data includes means for determining a first block of a first texture view is to be coded using a block-based view synthesis mode; means for locating, in a depth view, a first depth block that corresponds to the first block of the first texture view; means for determining depth values of two or more corner positions of the first depth block; based on the depth values, means for deriving a disparity vector for the first block; using the disparity vector, means for locating a first block of a second texture view; and, means for inter-predicting the first block of the first texture view using the first block of the second texture view.

In another example, a computer-readable storage medium stores instructions that when executed by one or more processors cause the one or more processors to determine a first block of a first texture view is to be coded using a block-based view synthesis mode; locate, in a depth view, a first depth block that corresponds to the first block of the first texture view; determine depth values of two or more corner positions of the first depth block; based on the depth values, derive a disparity vector for the first block; using the disparity vector, locate a first block of a second texture view; and, inter-predicting the first block of the first texture view using the first block of the second texture view.

The details of one or more examples are set forth in the accompanying drawings and the description below. Other features, objects, and advantages will be apparent from the description and drawings, and from the claims.

BRIEF DESCRIPTION OF DRAWINGS

FIG. 7 shows an example of a depth bock that may be used for deriving a disparity vector in accordance with the techniques of this disclosure.

DETAILED DESCRIPTION

Figure 1:
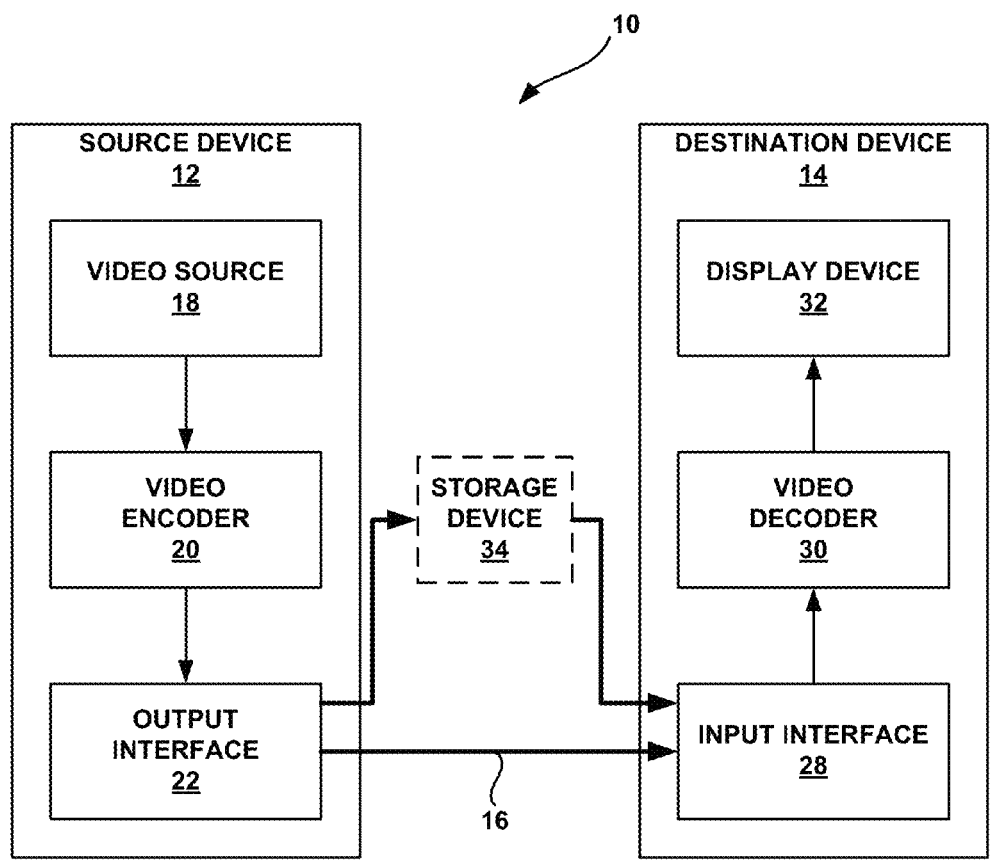
FIG. 1 is a block diagram illustrating an example video encoding and decoding system that may utilize the techniques described in this disclosure.

This disclosure describes techniques related to disparity vector derivation, and more particularly, this disclosure describes techniques in which a video coder (e.g., video encoder or video decoder) derives a disparity vector for a current block within a current picture of a current view for use in three-dimensional (3D) video coding. The video coder may use the disparity vector to locate a corresponding block in a different view. In this way, the disparity vector may represent the disparity between two similar video blocks in two different views. As will be explained in greater detail below, the video coder may use the disparity vector as a disparity motion vector, and a current block can be predicted based on the block that is located by the disparity motion vector. The video coder may also use the disparity vector for other purposes. As one example, the video coder may use the disparity vector to locate a corresponding block in another view, and then use motion information of the located block for determining motion information of the current block. Moreover, there may be still other uses for the disparity vector. In this disclosure, the term "current" is generally used to refer to a view, picture, or block currently being coded. Thus, a current block generally represents a block of vide data being coded, as opposed to an already coded block or as opposed to a yet to be coded block.

A disparity vector for a current block of a current picture is a vector that points to a corresponding block in a corresponding picture that is in a different view than the current picture. Thus, using a disparity vector, a video coder can locate, in a corresponding picture, the block that corresponds to a current block of a current picture. In this case, the corresponding picture is a picture that is of the same temporal instance as the current picture but is in a different view. The corresponding block in the corresponding picture and the current block in the current picture may include similar video content; however, there is at least a horizontal disparity between the location of the current block in the current picture and the location of the corresponding block in the corresponding picture. The disparity vector of the current block provides a measure of this horizontal disparity between the block in the corresponding picture and the current block in the current picture. In some instances, there may also be vertical disparity between the location of the block within the corresponding picture and the location of the current block within the current picture; however, in many instances the vertical disparity will be zero. The disparity vector of the current block may also provide a measure of this vertical disparity between the block in the corresponding picture and the current block in the current picture. A disparity vector contains two components (an x-component and a y-component), although in many instances the vertical component will be equal to zero. The time when the current picture of the current view and the corresponding picture of the different view are displayed may be the same, which is to say the current picture and the corresponding pictures are pictures of the same temporal instance.

In 2D video coding, a frame is represented only by one view component, sometimes referred to as a texture view component, or simply texture. In some types of 3D video coding, there are two view components: a texture view component and a depth view component, or simply texture and depth. For example, each view may include a texture view and a depth view, where the view includes a plurality of view components, e.g. the texture view includes a plurality of texture view components, and the depth view includes a plurality of depth view components. Each texture view component is associated with a depth view component to form a view component of a view. The depth view component represents relative depth of the objects in the texture view component. The depth view component and the texture view component may be separately decodable.

This disclosure describes techniques for deriving disparity vectors. One such technique for deriving a disparity vector may be used in conjunction with a backward view synthesis prediction (BVSP) mode. The video coder may determine a block of a first texture view is to be coded using a BVSP mode. The video coder may locate, in a depth view, a depth block that corresponds to the block of the first texture view and determine depth values for two or more corner positions of the depth block. Based on the depth values, the video coder may derive a disparity vector for the block, and using the disparity vector, locate a block of a second texture view. The video coder may then inter-predict the block of the first texture view using the block of the second texture view. In this regard, and as will be explained in more detail below, the techniques of this disclosure may simplify the disparity vector derivation process by determining a disparity vector, for use in BVSP mode, using only corner samples of the corresponding depth block.

In another example technique, for a block of a first view, a video coder may locate a depth block in a depth view that corresponds to the block of the first texture view, and based on at least one depth value of the depth block, derive a disparity vector for the block of the first texture view. The video coder may then code a first sub-block of the block based on the derived disparity vector and code a second sub-block of the macroblock based on the same derived disparity vector. In this regard and as will be explained in more detail below, the techniques of this disclosure may simplify the disparity vector derivation process by deriving one disparity vector for a block and using that disparity for two or more sub-blocks of the block. Depending on the coding mode specified for a particular sub-block, the video coder may use the derived disparity vector as a disparity motion vector or may use the disparity vector to identify a corresponding block in a different view, and from that corresponding block, determine motion information for predicting the sub-block.

FIG. 1 is a block diagram illustrating an example video encoding and decoding system 10 that may be configured to perform the techniques for disparity vector derivation described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming devices, or the like. In some cases, source device 12 and destination device 14 may be equipped for wireless communication.

System 10 may operate in accordance with different video coding standards, a proprietary standard, or any other way of multiview coding. The following describes a few examples of video coding standards, and should not be considered limiting. Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. The latest joint draft of MVC is described in "Advanced video coding for generic audiovisual services," ITU-T Recommendation H.264, March 2010, the entire content of which is incorporated herein by reference. Another joint draft of the MVC is described in "Advanced video coding for generic audiovisual services," ITU-T Recommendation H.264, June 2011, the entire content of which is incorporated herein by reference. Some additional video coding standards include the MVC+D and 3D-AVC, which are based on AVC. In addition, a new video coding standard, namely the High-Efficiency Video Coding (HEVC), has been developed by the Joint Collaboration Team on Video Coding (JCT-VC) of ITU-T Video Coding Experts Group (VCEG) and ISO/IEC Motion Picture Experts Group (MPEG).

For purposes of illustration only, the techniques described in this disclosure are described with examples in accordance the H.264 standard, such as the 3D-AVC. However, the techniques described in this disclosure should not be considered limited to these example standards, and may be extendable to other video coding standards for multiview coding or 3D video coding (e.g., 3D-HEVC), or to techniques related to multiview coding or 3D video coding that are not necessarily based on a particular video coding standard. For example, the techniques described in this disclosure are implemented by video encoders/decoders (codecs) for multiview coding, where multiview coding includes coding of two or more views.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 34. Similarly, encoded data may be accessed from storage device 34 by input interface. Storage device 34 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 34 may correspond to a file server or another intermediate storage device that may hold the encoded video generated by source device 12. Destination device 14 may access stored video data from storage device 34 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 34 may be a streaming transmission, a download transmission, or a combination of both.

The techniques of this disclosure for disparity vector derivation are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 34 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 34, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. For example, the techniques described in this disclosure may be described from the perspective of an apparatus or a device. As one example, the apparatus or device may include video decoder 30 (e.g., destination device 14 as part of a wireless communication device), and video decoder 30 may include one or more processors configured to implement techniques described in this disclosure (e.g., decode video data in accordance with techniques described in this disclosure). As another example, the apparatus or device may include a micro-processor or an integrated circuit (IC) that includes video decoder 30, and the microprocessor or IC may be part of destination device 14 or another type of device. The same may apply for video encoder 20 (i.e., an apparatus or device like source device 12 and/or a micro-controller or IC includes video encoder 20, where video encoder 20 is configured to encode video data in accordance with techniques described in this disclosure).

When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

A video sequence typically includes a series of video pictures from a view. A group of pictures (GOP) generally comprises a series of one or more video pictures. A GOP may include syntax data in a header of the GOP, a header of one or more pictures of the GOP, or elsewhere, that describes a number of pictures included in the GOP. Each picture may include picture syntax data that describes an encoding mode for the respective picture. Video encoder 20 typically operates on video blocks within individual video pictures in order to encode the video data. A video block may correspond to a macroblock, a partition of a macroblock, and possibly a sub-block of a partition, as defined in the H.264 standard. The video blocks may have fixed or varying sizes, and may differ in size according to a specified coding standard. Each video picture may include a plurality of slices. Each slice may include a plurality of blocks.

As an example, the ITU-T H.264 standard supports intra-prediction in various block sizes, such as 16 by 16, 8 by 8, or 4 by 4 for luma components, and 8×8 for chroma components, as well as inter-prediction in various block sizes, such as 16×16, 16×8, 8×16, 8×8, 8×4, 4×8 and 4×4 for luma components and corresponding scaled sizes for chroma components. In this disclosure, "N×N" and "N by N" may be used interchangeably to refer to the pixel dimensions of the block in terms of vertical and horizontal dimensions (e.g., 16×16 pixels or 16 by 16 pixels). In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

When the block is intra-mode encoded (e.g., intra-predicted), the block may include data describing an intra-prediction mode for the block. As another example, when the block is inter-mode encoded (e.g., inter-predicted), the block may include information defining a motion vector for the block. This motion vector refers to a reference picture in the same view (e.g., a temporal motion vector), or refers to a reference picture in another view (e.g., a disparity motion vector). The data defining the motion vector for a block describes, for example, a horizontal component of the motion vector, a vertical component of the motion vector, a resolution for the motion vector (e.g., one-quarter pixel precision or one-eighth pixel precision). In addition, when inter-predicted, the block may include reference index information such as a reference picture to which the motion vector points, and/or a reference picture list (e.g., RefPicList0 or RefPicList1) for the motion vector.

In the H.264 standard, following intra-predictive or inter-predictive coding, video encoder 20 calculates residual data for the macroblocks. The residual data may correspond to pixel differences between pixels of the unencoded picture and prediction values for the macroblock in H.264.

Following any transforms to produce transform coefficients, video encoder 20 performs quantization of the transform coefficients, in some examples. Quantization generally refers to a process in which transform coefficients are quantized to possibly reduce the amount of data used to represent the coefficients, providing further compression. The quantization process reduces the bit depth associated with some or all of the coefficients. For example, an n-bit value is rounded down to an m-bit value during quantization, where n is greater than m.

In some examples, video encoder 20 utilizes a predefined scan order to scan the quantized transform coefficients to produce a serialized vector that can be entropy encoded. In other examples, video encoder 20 performs an adaptive scan. After scanning the quantized transform coefficients to form a one-dimensional vector, in some examples, video encoder 20 entropy encodes the one-dimensional vector according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology, as a few examples. Video encoder 20 also entropy encodes syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video decoder 30 implements the inverse of the techniques of video encoder 20. For example, video decoder 30 decodes the encoded video bitstream and determines the residual blocks by inverse quantization and inverse transform. Video decoder 30 sums the residual blocks with blocks of previously decoded pictures to determine the pixel values for the blocks within the picture.

Certain techniques described in this disclosure may be performed by both video encoder 20 and video decoder 30. As one example, video encoder 20 may derive a disparity vector as part of determining how to encode a block of video data. Video encoder 20 may also derive the disparity vector as part of a decoding loop used to generate reference pictures. Video decoder 30 may perform the same disparity vector derivation technique performed by video encoder 20 as part of decoding the video block. This disclosure may at times refer to techniques as being performed by video decoder 30, but unless specified otherwise, it should be assumed that the techniques described with reference to video decoder 30 may also be performed by video encoder 20.

As described above, the techniques described in this disclosure are directed to 3d video coding. To better understand the techniques, the following describes some H.264/AVC coding techniques, multiview video coding from the perspective of H.264/MVC extension and the High Efficiency Video Coding (HEVC) standard, and 3D-AVC techniques.

For H.264/Advance Video Coding (AVC), video encoding or decoding (e.g., coding) is implemented on macroblocks, where a macroblock represents a portion of a frame which are inter-predicted or intra-predicted (i.e., inter-prediction encoded or decoded or intra-prediction encoded or decoded). For instance, in H.264/AVC, each inter Macroblock (MB) (e.g., inter-predicted macroblock) may be partitioned in four different ways: one 16×16 MB partition, two 16×8 MB partitions, two 8×16 MB partitions, or four 8×8 MB partitions. Different MB partitions in one MB may have different reference index values for each direction (i.e., RefPicList0 or RefPicList1). When a MB is not partitioned into multiple (more than 1) MB partitions, it has only one motion vector for the whole MB partition in each direction.

As part of video coding (encoding or decoding), video decoder 30 may be configured to construct one or two reference picture lists, referred to as RefPicList0 and RefPicList1. The reference picture list(s) identify reference pictures that can be used to inter-predict macroblocks of a frame or a slice. For instance, video encoder 20 may signal a reference index and a reference picture list identifier. Video decoder 30 may receive the reference index and the reference picture list identifier and determine the reference picture that is to be used for inter-prediction decoding the current macroblock from the reference index and the reference picture list identifier.

When a MB is partitioned into four 8×8 MB partitions, each 8×8 MB partition can be further partitioned into H.264/AVC sub-blocks. There are four different ways to get H.264/AVC sub-blocks from an 8×8 MB partition: one 8×8 sub-block, two 8×4 sub-blocks, two 4×8 sub-blocks, or four 4×4 sub-blocks. Each H.264/AVC sub-block can have a different motion vector in each direction but share the same reference picture index for each direction. The manner in which an 8×8 MB partition is partitioned into sub-blocks is named sub-block partitioning.

This disclosure will generally use the term block to refer to any block of video data. For example, in the context of H.264 coding and its extensions, a block may refer to any of macroblocks, macroblock partitions, sub-blocks, or any other types of blocks. In the context of HEVC and its extensions, a block may refer to any of PUs, TUs, CUs, or any other types of blocks. A sub-block as used in this disclosure generally refers to any portion of a larger block. A sub-block may also itself be referred to simply as a block. When referring specifically to a sub-block as defined in H.264/AVC, the term H.264/AVC sub-block may be used. Otherwise, sub-block, as used in this disclosure, is generally intended to be a generic term which encompasses H.264/AVC sub-block as well as the other types of sub-blocks described above.

For multiview video coding there are multiple different video coding standards. To avoid confusion, when this disclosure describes multiview video coding generically, this disclosure uses the phrase "multiview video coding." In general, in multiview video coding, there is a base view and one or more non-base or dependent views. The base view is fully decodable without reference to any of the dependent views (i.e., the base view is only inter-predicted with temporal motion vectors). This allows a codec that is not configured for multiview video coding to still receive at least one view that is fully decodable (i.e., the base view can be extracted out and the other views discarded, allowing a decoder not configured for multiview video coding to still decode the video content albeit without 3D experience). The one or more dependent views may be inter-predicted with respect to the base view or with respect to another dependent view (i.e., disparity compensation predicted), or with respect to other pictures in the same view (i.e., motion compensated predicted).

Whereas "multiview video coding" is used generically, the acronym MVC is associated with an extension of H.264/AVC. Accordingly, when the disclosure uses the acronym MVC, the disclosure is referring specifically to the extension to H.264/AVC video coding standard. The MVC extension of H.264/AVC relies upon disparity motion vectors as another type of motion vector in addition to temporal motion vectors. Another video coding standard, referred to as MVC plus depth (MVC+D), has also been developed by JCT-3V and MPEG. MVC+D applies the same low-level coding tools as those of MVC for both texture and depth, with the decoding of depth being independent to the decoding of texture and vice-versa. For instance, in MVC, a frame is represented only by one view component, referred to as a texture view component, or simply texture. In MVC+D, there are two view components: texture view component and depth view component, or simply texture and depth. For example, in MVC+D, each view includes a texture view and a depth view, where the view includes a plurality of view components, the texture view includes a plurality of texture view components, and the depth view includes a plurality of depth view components.

Each texture view component is associated with a depth view component to form a view component of a view. The depth view component represents relative depth of the objects in the texture view component. In MVC+D, the depth view component and the texture view component are separately decodable. For example, video decoder 30 may implement two instances of an MVC codec, in which a first codec decodes the texture view components and a second codec decodes the depth view components. These two codecs can execute independent of one another because the texture view components and the depth view components are separately encoded.

In MVC+D, a depth view component is always immediately following the associated (e.g., corresponding) texture view component. In this manner, MVC+D supports texture-first coding, where the texture view component is decoded prior to the depth view component.

A texture view component and its associated (e.g., corresponding) depth view component may include the same picture order count (POC) value and view_id (i.e., the POC value and view_id of a texture view component and its associated depth view component is the same). The POC value indicates the display order of the texture view component and the view_id indicates the view to which the texture view component and depth view component belong.

Figure 2:
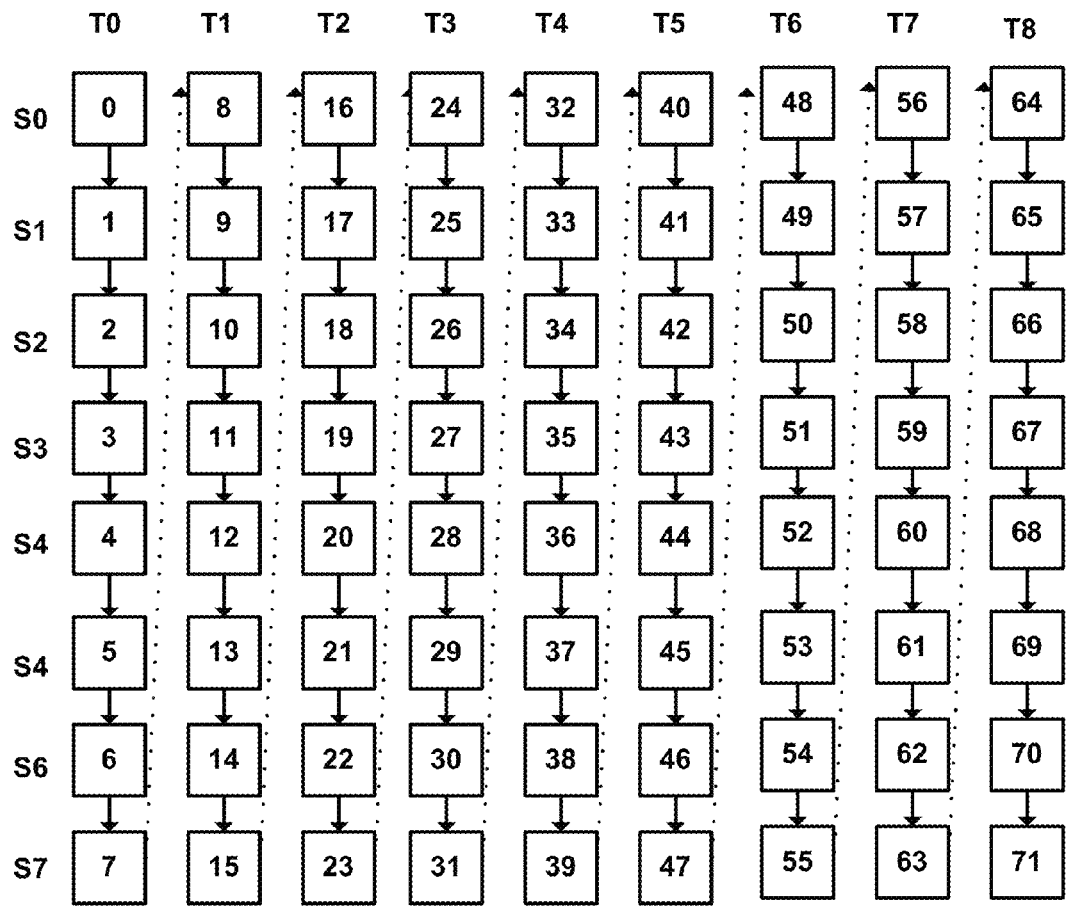
FIG. 2 is a conceptual diagram illustrating an example multiview decoding order.

FIG. 2 shows a typical MVC decoding order (i.e. bitstream order). The decoding order arrangement is referred as time-first coding. Note that the decoding order of access units may not be identical to the output or display order. In FIG. 2, S0-S7 each refers to different views of the multiview video. T0-T8 each represents one output time instance. An access unit may include the coded pictures of all the views for one output time instance. For example, a first access unit may include all of the views S0-S7 for time instance T0, a second access unit may include all of the views S0-S7 for time instance T1, and so forth.

For purposes of brevity, the disclosure may use the following definitions:

view component: A coded representation of a view in a single access unit. When a view includes both coded texture and depth representations, a view component may include a texture view component and a depth view component.

texture view component: A coded representation of the texture of a view in a single access unit.

depth view component: A coded representation of the depth of a view in a single access unit.

As discussed above, in the context of this disclosure, the view component, texture view component, and depth vide component may be generally referred to as a layer. In FIG. 2, each of the views includes sets of pictures. For example, view S0 includes set of pictures 0, 8, 16, 24, 32, 40, 48, 56, and 64, view S1 includes set of pictures 1, 9, 17, 25, 33, 41, 49, 57, and 65, and so forth. Each set includes two pictures: one picture is referred to as a texture view component, and the other picture is referred to as a depth view component. The texture view component and the depth view component within a set of pictures of a view may be considered as corresponding to one another. For example, the texture view component within a set of pictures of a view is considered as corresponding to the depth view component within the set of the pictures of the view, and vice-versa (i.e., the depth view component corresponds to its texture view component in the set, and vice-versa). As used in this disclosure, a texture view component that corresponds to a depth view component may be considered as the texture view component and the depth view component being part of a same view of a single access unit.

The texture view component includes the actual image content that is displayed. For example, the texture view component may include luma (Y) and chroma (Cb and Cr) components. The depth view component may indicate relative depths of the pixels in its corresponding texture view component. As one example analogy, the depth view component is like a gray scale image that includes only luma values. In other words, the depth view component may not convey any image content, but rather provide a measure of the relative depths of the pixels in the texture view component.

For example, a purely white pixel in the depth view component indicates that its corresponding pixel or pixels in the corresponding texture view component is closer from the perspective of the viewer, and a purely black pixel in the depth view component indicates that its corresponding pixel or pixels in the corresponding texture view component is further away from the perspective of the viewer. The various shades of gray in between black and white indicate different depth levels. For instance, a very gray pixel in the depth view component indicates that its corresponding pixel in the texture view component is further away than a slightly gray pixel in the depth view component. Because only gray scale is needed to identify the depth of pixels, the depth view component need not include chroma components, as color values for the depth view component may not serve any purpose. The above explanation is intended to be an analogy for purposes of relating depth images to texture images. The depth values in a depth image do not in fact represent shades of gray, but in fact, represent 8-bit, or other bit size, depth values.

The depth view component using only luma values (e.g., intensity values) to identify depth is provided for illustration purposes and should not be considered limiting. In other examples, any technique may be utilized to indicate relative depths of the pixels in the texture view component.

Figure 3:
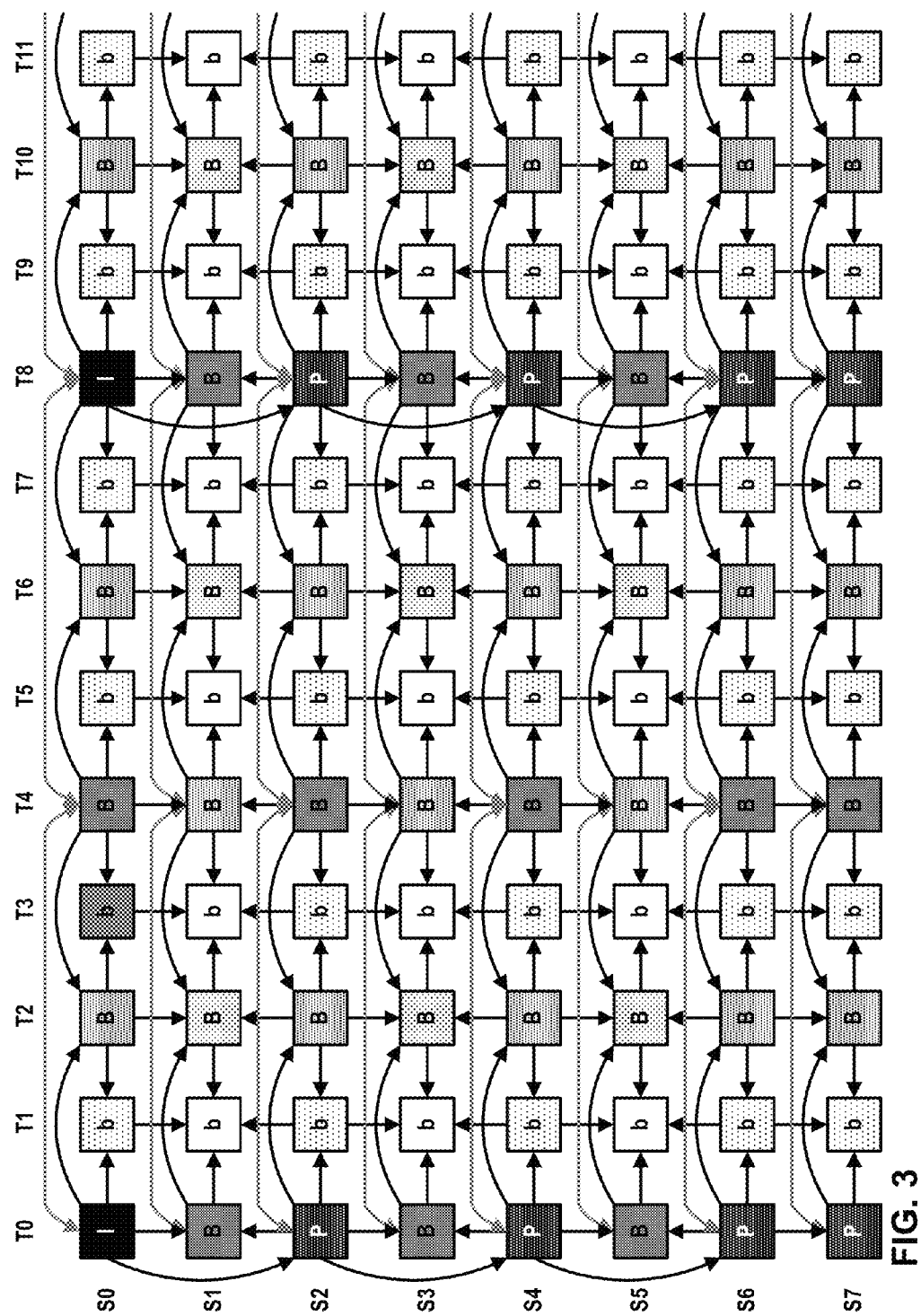
FIG. 3 is a conceptual diagram illustrating an example prediction structure for multiview coding.

FIG. 3 shows a typical MVC prediction structure (including both inter-picture prediction within each view and inter-view prediction between views) for multi-view video coding. Prediction directions are indicated by arrows, the pointed-to object using the pointed-from object as the prediction reference. In MVC, inter-view prediction is supported by disparity motion compensation, which uses the syntax of the H.264/AVC motion compensation, but allows a picture in a different view to be used as a reference picture.

In the example of FIG. 3, eight views (having view IDs "S0" through "S7") are illustrated, and twelve temporal locations ("T0" through "T11") are illustrated for each view. That is, each row in FIG. 3 corresponds to a view, while each column indicates a temporal location.

Although MVC has a so-called base view, which is decodable by H.264/AVC decoders, and stereo view pairs could be supported also by MVC, the advantage of MVC is that it could support an example that uses more than two views as a 3D video input and decodes this 3D video represented by the multiple views. A renderer of a client having an MVC decoder may expect 3D video content with multiple views.

Pictures in FIG. 3 are indicated at the intersection of each row and each column. The H.264/AVC standard may use the term frame to represent a portion of the video. This disclosure may use the term picture and frame interchangeably.

The pictures in FIG. 3 are illustrated using a block including a letter, the letter designating whether the corresponding picture is intra-coded (that is, an I-picture), or inter-coded in one direction (that is, as a P-picture) or in multiple directions (that is, as a B-picture). In general, predictions are indicated by arrows, where the pointed-to pictures use the pointed-from picture for prediction reference. For example, the P-picture of view S2 at temporal location T0 is predicted from the I-picture of view S0 at temporal location T0.

As with single view video encoding, pictures of a multi-view video coding video sequence may be predictively encoded with respect to pictures at different temporal locations. For example, the b-picture of view S0 at temporal location T1 has an arrow pointed to it from the I-picture of view S0 at temporal location T0, indicating that the b-picture is predicted from the I-picture. Additionally, however, in the context of multiview video encoding, pictures may be inter-view predicted. That is, a view component can use the view components in other views for reference. In MVC, for example, inter-view prediction is realized as if the view component in another view is an inter-prediction reference. The potential inter-view references are signaled in the Sequence Parameter Set (SPS) MVC extension and can be modified by the reference picture list construction process, which enables flexible ordering of the inter-prediction or inter-view prediction references. Inter-view prediction is also a feature of proposed multiview extension of HEVC, including 3D-HEVC (multiview plus depth).

FIG. 3 provides various examples of inter-view prediction. Pictures of view S1, in the example of FIG. 3, are illustrated as being predicted from pictures at different temporal locations of view S1, as well as inter-view predicted from pictures of views S0 and S2 at the same temporal locations. For example, the b-picture of view S1 at temporal location T1 is predicted from each of the B-pictures of view S1 at temporal locations T0 and T2, as well as the b-pictures of views S0 and S2 at temporal location T1.

In some examples, FIG. 3 may be viewed as illustrating the texture view components. For example, the I-, P-, B-, and b-pictures illustrated in FIG. 2 may be considered as texture view components for each of the views. In accordance with the techniques described in this disclosure, for each of the texture view components illustrated in FIG. 3 there is a corresponding depth view component. In some examples, the depth view components may be predicted in a manner similar to that illustrated in FIG. 3 for the corresponding texture view components.

Coding of two views may also be supported by MVC. One of the advantages of MVC is that an MVC encoder may take more than two views as a 3D video input and an MVC decoder may decode such a multiview representation. As such, any renderer with an MVC decoder may decode 3D video content with more than two views.

As discussed above, in MVC, inter-view prediction is allowed among pictures in the same access unit (meaning, in some instances, with the same time instance). When coding a picture in one of the non-base views, a picture may be added into a reference picture list, if it is in a different view but within a same time instance. An inter-view prediction reference picture may be put in any position of a reference picture list, just like any inter-prediction reference picture. As shown in FIG. 3, a view component can use the view components in other views for reference. In MVC, inter-view prediction is realized as if the view component in another view was an inter-prediction reference.

In MVC, inter-view prediction is allowed among pictures in the same access unit (i.e., with the same time instance). When coding a picture in one of the non-base views, a picture may be added into a reference picture list, if it is in a different view but with a same time instance. An inter-view prediction reference picture can be put in any position of a reference picture list, just like any inter prediction reference picture.

As shown in FIG. 3, a view component can use the view components in other views for reference. This is called inter-view prediction. In MVC, inter-view prediction is realized as if the view component in another view was an inter prediction reference.

In the context of multiview video coding, there are two kinds of motion vectors ne is a normal motion vector pointing to temporal reference pictures. The corresponding temporal inter prediction is motion-compensated prediction (MCP). The other type of motion vector is a disparity motion vector pointing to pictures in a different view (i.e., inter-view reference pictures). The corresponding inter prediction is disparity-compensated prediction (DCP).

The next section will discuss the AVC-based 3D video coding standard. Currently, a Joint Collaboration Team on 3D Video Coding (JCT-3V) of VCEG and MPEG is developing a 3DV standard based on H.264/AVC, i.e., 3D-AVC. For 3D-AVC, new coding tools besides the inter-view prediction in MVC have been included and supported. The latest software 3D-ATM for 3D-AVC can be downloaded from the following link: [3D-ATM version 6.2]: http://mpeg3dv.research.nokia.com/svn/mpeg3dv/tags/3DV-ATMv6.2/

The AVC based 3D video (3D-AVC) coding standard is currently under development by JCT-3V, and the latest version of 3D-AVC is now available in public: M. M. Hannuksela, Y. Chen, T. Suzuki, J.-R. Ohm, G. J. Sullivan, "3D-AVC draft text 5," JCT3V-C1002, Geneva, CH, January, 2013. It is available, as of 14 Mar. 2014, from the following link, and is hereby incorporated by reference: http://phenix.it-sudparis.eu/jct2/doc_end_user/documents/3_Geneva/wg11/JCT3V-C1002-v3.zip.

Coding order of view components in 3D-AVC will now be discussed. 3D-AVC is compatible with H.264/AVC in a way that the texture part of the base view is fully decodable by an H.264/AVC decoder. For example, the texture view components in view components of the base view may only be inter-predicted with other texture view components in the same base view. The texture view components in the base view may not be inter-view predicted. Also, the texture view component in the base view may not require the corresponding depth view component for decoding purposes.

For enhanced view components in 3D-AVC, in some other example techniques, the depth may be coded prior to the texture and a texture view component may be coded based on the information from the depth view component, which is also known as a depth-first coding. However, each texture view component is coded before the respective depth view components in texture-first coding order, such as in MVC+D described above. In other words, in some other example techniques, in 3D-AVC, the texture view component of the base view is coded first, followed by the associated depth view component of the base view, followed by the depth view component of a first enhancement or dependent view, followed by the associated texture view component of the first enhancement or dependent view, followed by the depth view component of a second enhancement or dependent view, followed by the associated texture view component of the second enhancement or dependent view, and so forth.

For example, the coding orders of the texture and depth view components in 3D-AVC are exemplified as follows. In the following examples, T0 and D0, respectively, refer to the texture and depth view components of the base view, and Ti and Di, respectively, refer to the texture and depth view components of the i-th dependent view. In the following examples, three views are considered.

In a first example, the views considered are T0, D0, D1, D2, T1, and T2. In this example, the base views (T0 and D0)

are coded with texture-first coding order while the dependent views are coded with the depth-first coding order. A hybrid coding order is currently used in common test conditions of 3D-AVC. In another example, the order of coding is T0, D0, T1, D1, T2, and D2. That is, all view components are coded with texture-first coding order.

If inter-view prediction is enabled for Ti, the reference texture view is defined as the view which includes the inter-view reference picture and the corresponding depth view is defined as the reference depth view which has the same view order index as that of the reference texture view.

3D-AVC disparity vector derivation via the depth map will now be discussed. Techniques for deriving the disparity vector may vary with each low-level coding tool, but, commonly, the depth data of the dependent view is used for disparity vector derivation for the texture view component coding. This is because the depth view of the dependent view is available, due to the depth-first coding order. The low-level coding tools used are in-loop block-based view synthesis inter-view prediction (BVSP) and depth-based motion vector prediction (D-MVP) in 3D-AVC. A video coder, e.g., video decoder 30 may use the disparity vector converted from the depth values of the depth view (sometimes called depth map) in the dependent view (sometimes called dependent frame). In 3D-AVC reference software, typically, the results of the conversion process from the actual depth map value to a disparity to a particular view are stored in look-up tables with camera parameters.

Maximum depth derivation from four corners, for use in disparity vector derivation, will now be discussed. For deriving the depth value, video decoder 30 first identifies the reference depth block of a depth view component. The reference depth block is co-located/corresponding to the current MB/partition/sub-block. In the identified reference depth block, video decoder 30 accesses the four corner samples corresponding to the top-left, top-right, bottom-left and bottom-right depth samples. A depth value is then calculated by taking the maximum of the four corner depth samples.

Finally, video decoder 30 infers the horizontal component of a disparity vector from the look-up table using the calculated depth value and setting the vertical component of the disparity vector to 0. In this method, the number of accessed depth samples increases when the MB is divided into partitions or sub-blocks. For example, when a 16×16 MB is partitioned into four 8×8 partitions, the number of the depth samples to be accessed is 16, and when a 16×16 MB is partitioned into sixteen 4×4 partitions, the number of the depth samples to be accessed is 64.

BVSP in 3D-AVC is a coding mode supported by 3D-AVC as well as other coding standards. BVSP was originally proposed in "3DV-CE1.a: Block-Based View Synthesis Prediction for 3DV-ATM" (JCT3V-A0107) by W. Su, et al., which can be downloaded from the following link, and is hereby incorporated by reference: http://phenix.it-sudparis.eu/jct2/doc_end_user/documents/1_Stockholm/wg11/JCT3V-A0107-v1.zip.

Figure 4:
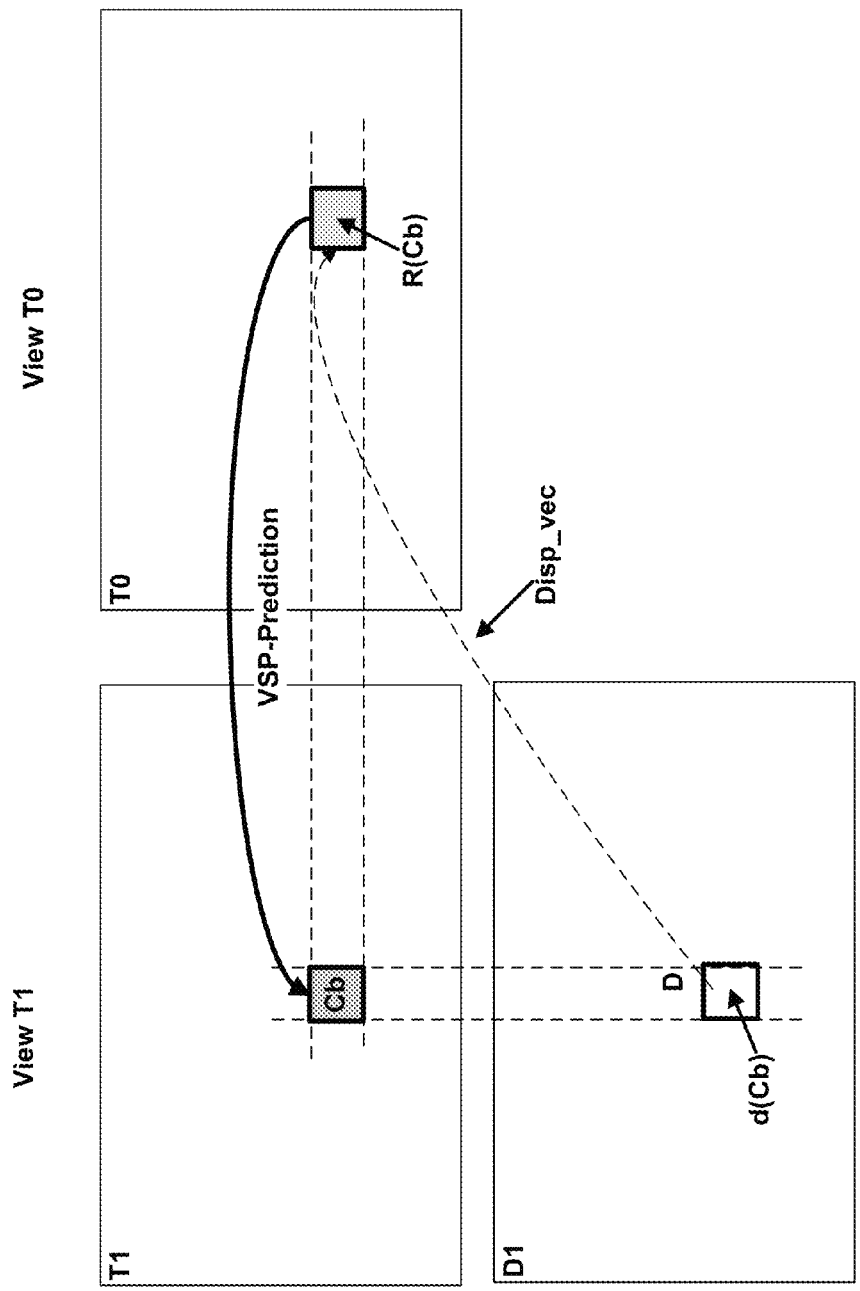
FIG. 4 is a conceptual visualization of block-based view synthesis prediction based on backward warping.

FIG. 4 is a conceptual diagram of BVSP based on backward warping. Referring to FIG. 4, assume that the following coding order is utilized, (T0, D0, D1, T1), with T referring to texture views and D referring to depth views. Texture component T0 is a base view, and T1 is a dependent view coded with VSP. Depth map components D0 (not shown in FIG. 4) and D1 are respective depth maps associated with T0 and T1.

In dependent view T1, sample values of currently coded block Cb are predicted from reference area R(Cb), using VSP-Prediction, that consists of sample values of the base view T0. The displacement vector (Disp_vec) between current samples to be coded (i.e. Cb) and reference samples (i.e. R(Cb)) is denoted as a derived disparity vector between T1 and T0 from a depth map value associated with a currently coded texture sample.

The process of conversion from a depth value to a disparity vector may be performed for example with following equations:

$$Z(Cb(j, i)) = \frac{1}{\frac{d(Cb(j, i))}{255} \cdot \left(\frac{1}{Znear} - \frac{1}{Zfar}\right) + \frac{1}{Zfar}};  \quad (1)$$

$$D(Cb(j, i)) = \frac{f \cdot b}{Z(Cb(j, i))};  \quad (2)$$

where j and i are local spatial coordinates within Cb, d Cb(j,i) is a depth map value in depth map image of a view 1, Z is the actual corresponding depth value, and D is the horizontal component of a derived disparity vector to a particular view 0. The parameters f, b, Znear and Zfar are parameters specifying the camera setup; i.e., the used focal length (f), camera separation (b) between view #1 and view #0, and depth range (Znear, Zfar) representing parameters of depth map conversion.

Note that, in some examples, the vertical component of the derived disparity vector is set to 0. Also, in some 3DV-ATM implementation, equations (1) and (2) have been already pre-computed for every depth map value (0 . . . 255) and stored as a look up-table.

In the example of FIG. 3, Cb represents a block currently being coded. Video decoder 30 may code Cb using a BVSP mode. If Cb is to be coded using BVSP mode, then video decoder 30 identifies the depth block, d(Cb) in FIG. 4, corresponding to Cb. In this regard, corresponding means co-located. Depth block d(Cb) includes a plurality of depth values. Based on one or more of those depth values of d(Cb), video decoder 30 determines a disparity value. That disparity value may be used as the x-component of a disparity vector, with the y-component being set to 0. Using the disparity vector, video decoder 30 may identify a reference block, R(cb) in the example of FIG. 4, in a different view and inter-predict block Cb based on that reference block.

The depth view resolution and the texture view resolution may be the same, or they may be different. If the depth view resolution and the texture view resolutions are different, then video decoder 30 may perform a conversion to find the co-located depth the block. Video decoder 30 may perform the conversion as follows. Let (x,y) denote the top-left position of the block Cb. The top-left corner position of the co-located block in the depth view is represented by (x>>reduced_resolution_flag, y>>reduced_resolution_flag). The syntax element "reduced_resolution_flag" is equal to 1 to specify that the depth view components of a view component pair have a lower spatial resolution than the luma component of the texture view component of the same view component pair, and the width and height of the depth view components are both half of the width and height of all the texture view components.

The next section of this disclosure will discuss several implementation issues of BVSP. One issue involves the indication of BVSP blocks, i.e. what blocks are to be coded using BVSP mode. BVSP blocks are indicated as follows:

One flag at a MB-level is used to signal whether the current MB is coded with the conventional skip/direct mode or if it is coded with the skip/direct mode but predicted from a synthetic reference component. In this context, "conventional skip/direct mode refers to the extended version of skip/direct mode used in the H.264/AVC coding standard, and a synthetic reference component refers to a reference block generated from an inter-view block.

For each MB partition (from 16×16 to 8×8), a reference index (or a flag, as in some proposals for 3D-AVC) in each reference picture list is used to signal the reference picture. When a partition is coded in BVSP mode, motion vector differences are not signaled since there are no motion vectors for BVSP coded blocks.

When either the flag or the reference index indicates a synthetic reference component, the prediction of one partition as described in the following item is invoked. In other words, a bit may indicate if the MB or MB-partition is coded using conventional skip/direct modes or a BVSP mode. In BVSP mode, video decoder 30 decodes the part of a MB or MB-partition that is coded using BVSP mode (you are calling as Synthetic skip/direct) by dividing the MB or MB-partition into K×K blocks, and for each K×K block, identifying the collocated depth block, getting a disparity value from the depth block, and predicting the MB or MB-partition from the inter-view reference picture pointed to by the disparity vector.

In 3D-AVC, for conventional skip/direct mode, video decoder 30 derives the motion vector and the reference index as follows. The motion vector of the corresponding block (pointed by the disparity vector) in the reference view, if available, is set equal to the motion vector of the current block, and the reference index of the current block is derived accordingly. If the inter-view motion vector is unavailable, i.e., the reference block in the base view pointed by the disparity vector is intra-coded, a conventional median-based motion vector prediction scheme is used, by setting the reference index to zero.

Another implementation issue with BVSP involves the prediction derivation process. For each MB partition, with its size denoted by N×M (wherein N or M shall be 8 or 16), if the MB partition is coded with BVSP mode, a current MB partition is further partitioned into several sub-regions with a size equal to K×K (wherein K may be 8×8, as in some proposals for 3D-AVC, 4×4, 2×2 or 1×1). For each sub-region, a separate disparity vector is derived and each sub-region is predicted from one block located by the derived disparity vector in the inter-view reference picture, e.g., R(cb) in FIG. 4. In some example common test conditions, K is defined to be 4. Note that the derived disparity vectors are not stored for BVSP coded blocks, since there are no coding tools that use such vectors.

Another implementation issue with BVSP involves the disparity vector derivation process. When a depth first coding order is applied, the disparity vector is derived by converting a depth value from the corresponding depth block in the corresponding non-base depth view, as shown in the example of FIG. 4. A single depth value is calculated by first accessing the four corner depth samples from the depth block co-located/corresponding to the K×K sub-region and then by taking the maximum value of the four accessed depth samples. The calculated depth value is later converted into a disparity vector using equations (1) and (2). When texture first coding order is applied, BVSP modes are disabled since the corresponding non-base depth view is unavailable when decoding the non-base texture view.

Depth-based motion vector prediction (D-MVP) in 3D-AVC for normal inter prediction modes will now be discussed. D-MVP refers to a motion vector prediction method that uses the associated depth map data of the current view which is available due to the depth-first coding order. The method is applied with the texture view components in the dependent views.

In 3D-AVC, motion vector prediction still utilizes the neighbouring blocks. The neighboring blocks include, in order, a left block, above block, above-right block and above-left block of the current block. The motion vector in the above-left block is used only when one of the other three neighboring blocks does not contain a motion vector thus considered as unavailable.

The motion vector from a neighbouring block is considered as unavailable if it has a different type as the current motion vector to be predicted. The type of a motion vector depends on the corresponding reference index. That is, if the reference index corresponds to an inter-view reference picture, the motion vector is a disparity motion vector and the type is "disparity" and if the reference index corresponds to a temporal reference picture (in the same view), the motion vector is a temporal motion vector and the type is "temporal."

In 3D-AVC, if three neighboring blocks are available, the motion vectors in the three neighboring blocks are employed for the motion vector prediction of the current block. In temporal prediction, if their motion vectors all have the same type and have the same reference indices, median filter is directly used as in H.264/AVC, otherwise (if they belong to different types and have different reference indices), a motion vector is further derived. When the current reference picture is inter-view reference picture, the motion vector types and their reference indices in neighboring block positions are checked, and, if they have all the same type and the same reference indices, the median filter is applied. In both cases, if less than three neighboring blocks are available; motion vectors for the unavailable blocks are further derived so that three neighboring blocks become available.

If a spatial neighboring block does not contain an available temporal motion vector, a temporal motion vector is to be predicted for the current block. A reference block of the current block in the reference view picture is identified by the disparity vector derived as described above with respect to block-based view synthesis prediction. The motion vector of a block containing the center position of the reference block, if it is a temporal motion vector, is derived for the current spatial neighboring block. If the temporal motion vector is considered to be unavailable (Intra block or not pointing to a reference picture in the reference view aligned with the current reference picture), the derived motion vector is set to zero.

If a spatial neighboring block does not contain an available disparity motion vector and a disparity motion vector is to be predicted for the current block, the disparity vector derived for the current block is converted to a disparity motion vector as described above with respect to block-based view synthesis prediction In 3D-AVC, the D-MVP method is incorporated into the conventional median function-based motion vector prediction in H.264/AVC. So when the motion vectors in spatial neighboring blocks are available, (or not available originally but made available with the methods mentioned above), the median function can be applied still to three motion vectors, however all of them should belong to the same type.

Inter-view motion prediction in the 3D-AVC for skip and direct modes will now be discussed. The inter-view motion prediction in the 3D-AVC is performed in P-skip, B-skip, B-16×16 direct, and B-8×8 direct modes. In these modes, a disparity vector used to identify a reference block is either from the neighboring blocks or from the derived disparity vector (see above regarding block-based view synthesis prediction) from the corresponding depth block associated with the current MB. The candidate neighboring blocks A, B and C is checked for its availability whether if it has disparity motion vector or not. If one spatial neighboring block is available i.e., and it contains a disparity motion vector, this disparity motion vector becomes the disparity vector.

If the disparity vector for the spatial neighboring blocks A, B and C is unavailable, a disparity vector derived from the depth block (see above regarding block-based view synthesis prediction) associated with the current MB is used for the unavailable block. Afterwards, a median filter is applied to get the disparity vector.

This disparity vector got from the above process is used to get a reference block in a reference view picture. Within the reference block, the motion vector (namely inter-view motion vector) if available, is set equal to the motion vector of the current block and the reference index of the current block is derived accordingly.

If the inter-view motion vector is not available, i.e., the reference block in the base view pointed by the disparity vector is intra-coded, conventional median-based motion vector prediction scheme is used. In this case a reference index is derived first and the D-MVP scheme described in section 1.4.5 is used to derive the motion vector prediction for the current MB.

Improvements for disparity vector derivation will now be discussed. In JCT3V-C0122, a simplified disparity vector derivation method has been proposed. In the proposed method, when the current MB is coded with inter-prediction modes that are not skip or direct, all the partition/sub-blocks with the current MB share the derived disparity vector that is calculated from the bottom-right depth sample of the associated depth block of the current MB. However, when the current MB is coded with a skip or direct mode, a different disparity vector derivation process, i.e., accessing four corner samples of the reference depth block is utilized. Furthermore, in BVSP mode, accessing the four corner samples of the reference depth block of the each K×K sub-region of an MB partition is still required.

In JCT3V-00134, it is proposed that when coded with inter modes, all partition blocks within the same MB share the single disparity vector which is derived from a maximum depth value of four corner samples from the same reference depth block which is co-located/corresponding to the current MB. However, for the BVSP mode, accessing the four corner samples of the reference depth block of the each K×K sub-region of an MB partition is still required.

This disclosure will now discuss aspects of 3D-HEVC. Neighboring block-based disparity vector derivation (NBDV) may be used as a disparity vector derivation method in 3D-HEVC that uses the texture-first coding order for all the views. In the current 3D-HEVC design, the disparity vector derived from NBDV could be further refined by retrieving the depth data from a reference view's depth map. In NBDV, a disparity vector (DV) is used as an estimator of the displacement between two views. As neighboring blocks share almost the same motion/disparity information in video coding, the current block can use the motion vector information in neighboring blocks as a good predictor. Following this idea, NBDV uses the neighboring disparity information for estimating the disparity vector in different views.

Several spatial and temporal neighboring blocks are firstly defined. Each of the neighboring blocks is then checked in a pre-defined order, determined by the priority of the correlation between the current block and the candidate block. Once a disparity motion vector (i.e., the motion vector that points to an inter-view reference picture) is found in the candidates, the disparity motion vector is converted to a disparity vector. Two sets of neighboring blocks are utilized. One set is from spatial neighboring blocks and the other set is from temporal neighboring blocks.

3D-HEVC first adopted the Neighboring Block (based) Disparity Vector (NBDV) method proposed in JCT3V-A0097, 3D-CE5.h: Disparity vector generation results, L. Zhang, Y. Chen, M. Karczewicz (Qualcomm). Implicit disparity vectors were included with a simplified NBDV in JCTVC-A0126, 3D-CE5.h: Simplification of disparity vector derivation for HEVC-based 3D video coding, J. Sung, M. Koo, S. Yea (LG). On top of that, in JCT3V-B0047, 3D-CE5.h related: Improvements for disparity vector derivation, J. Kang, Y. Chen, L. Zhang, M. Karczewicz (Qualcomm), the NBDV is further simplified by removing the implicit disparity vectors stored in the decoded picture buffer, but also improved a coding gain with the RAP picture selection.

Figure 5:
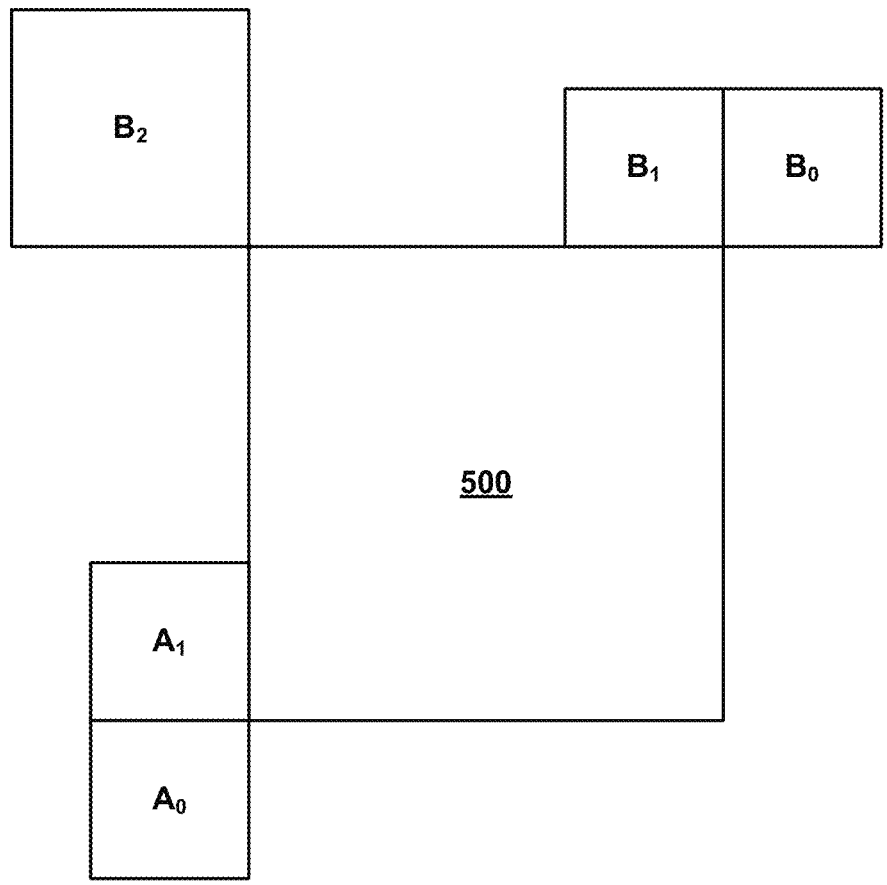
FIG. 5 is a conceptual diagram showing spatial neighboring blocks used for neighboring block disparity vector derivation.

In the current (as of the time of this disclosure) NBDV, five spatial neighboring blocks are used for the disparity vector derivation. They are the below-left, left, above-right, above, and above-left blocks of current block (e.g., current prediction unit (PU)), as denoted by A0, A1, B0, B1 or B2 in FIG. 5. It should be noted that these neighboring blocks are the same as those used in the MERGE modes in HEVC. Therefore, no additional memory access is required.

For checking temporal neighboring blocks, a video coder may first perform a construction process of a candidate picture list. In one example, up to two reference pictures from current view may be treated as candidate pictures. The video coder may first insert a co-located reference picture into the candidate picture list, followed by the rest of the candidate pictures in the ascending order of reference index. When the reference pictures with the same reference index in both reference picture lists are available, the one in the same reference picture list of the co-located picture may precede the other one. For each candidate picture in the candidate picture list, three candidate regions may be determined for deriving the temporal neighboring blocks.

When a block is coded with inter-view motion prediction, a disparity vector may be derived for selecting a corresponding block in a different view. An implicit disparity vector (IDV, also referred to as a derived disparity vector) is referred to as the disparity vector derived in the inter-view motion prediction. Even though the block is coded with motion prediction, the derived disparity vector is not discarded for the purpose of coding a following block.

In the current design of 3D-HTM 6.0, the video coder, in accordance with the NBDV process, checks disparity motion vectors in the temporal neighboring blocks, disparity motion vectors in the spatial neighboring blocks, and then the IDVs in order. Once, the disparity motion vector or IDV is found, the process is terminated.

A video coder may further refine disparity vectors derived using NBDV by accessing depth information. When one disparity vector is derived from the NBDV process, the video coder may further refine the disparity vector by retrieving the depth data from the depth map of the reference view. The refinement process may include two steps:

a) Locate a corresponding depth block by the derived disparity vector in the previously coded reference depth view, such as the base view; the size of the corresponding depth block is the same as that of current PU.

b) Select one depth value from four corner pixels of the corresponding depth block and convert it to the horizontal component of the refined disparity vector. The vertical component of the disparity vector is unchanged.

The video coder may use the refined disparity vector for inter-view motion prediction while the unrefined disparity vector is used for inter-view residual prediction. In addition, the refined disparity vector may be stored as the motion vector of one PU if it is coded with backward VSP mode.

In accordance with the techniques of this disclosure, one of the spatially neighboring blocks may correspond to a BVSP-coded block, and another one of the spatially-neighboring blocks may correspond to a non-BVSP-coded block. For example, block A1 may correspond to a BVSP-coded block and block B1 may correspond to a non-BVSP-coded block. Nevertheless, when coding motion information for the current block, a video coder may access motion information for both block A1 and block B1 using the same logic function. It is presumed that the motion information for the BVSP-coded block, i.e., block A1 in the example stated above, includes a reference index that identifies a reference picture. Therefore, a separate logic function for accessing motion information of block A1 need not be provided in the video coder.

Figure 6:
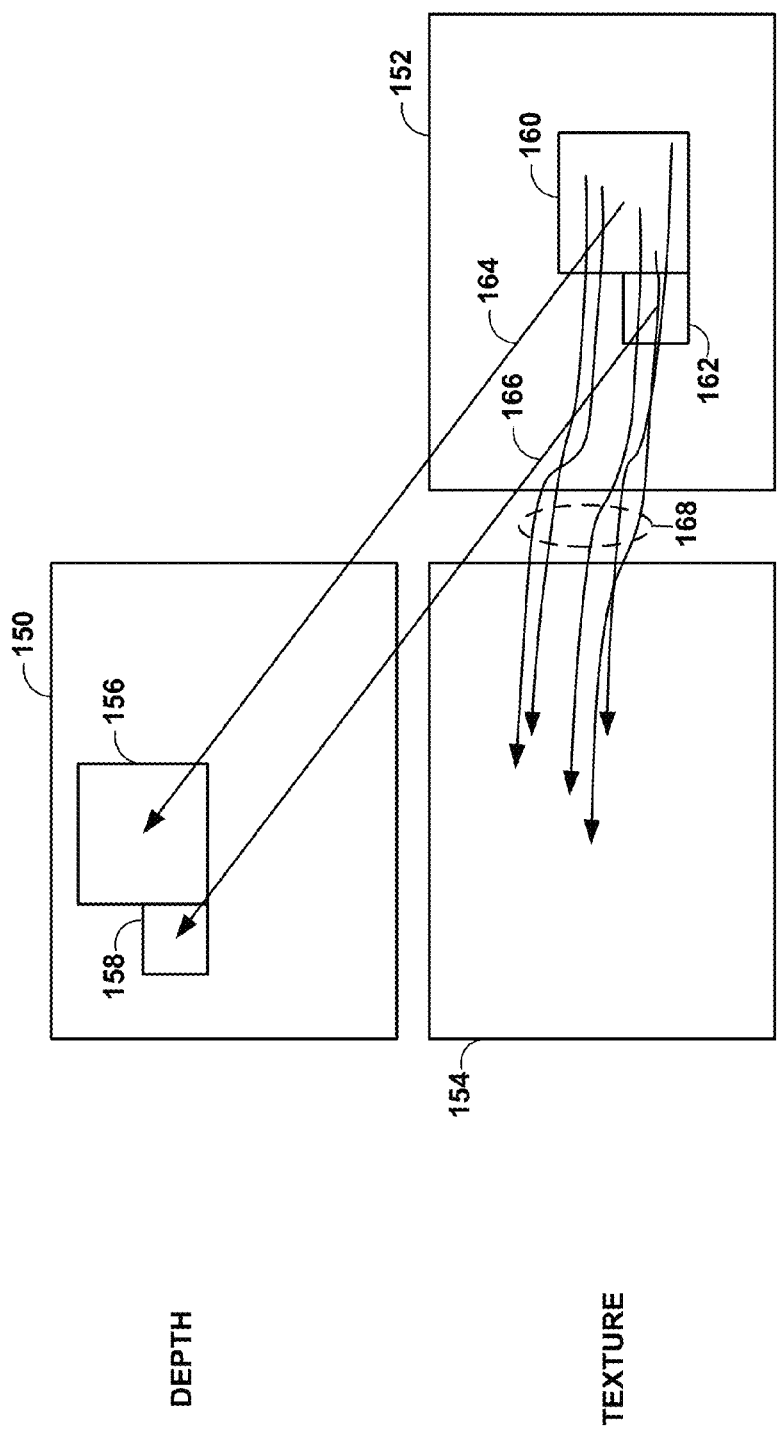
FIG. 6 is a conceptual diagram illustrating techniques related to backward view synthesis prediction (BVSP) using neighboring blocks.

FIG. 6 is a conceptual diagram illustrating techniques related to backward view synthesis prediction (BVSP) using neighboring blocks. BVSP has been proposed, and adopted, as a technique for 3D-HEVC. The backward-warping VSP approach as proposed in JCT3V-00152 was adopted in the 3rd JCT-3V meeting. The basic idea of this backward-warping VSP is the same as the block-based VSP in 3D-AVC. Both of these two techniques use the backward-warping and block-based VSP to avoid transmitting the motion vector differences and use more precise motion vectors. Implementation details are different due to different platforms. This disclosure generally uses the initialism BVSP to refer to backward view synthesis prediction in 3D-HEVC, although BVSP may also refer to block-based view synthesis prediction of 3D-AVC.

In 3D-HTM, texture first coding is applied in common test conditions. Therefore, the corresponding non-base depth view is unavailable when decoding one non-base texture view. Therefore, the depth information is estimated and used to perform BVSP. In order to estimate the depth information for a block, it was proposed to first derive a disparity vector from the neighboring blocks, and then use the derived disparity vector to obtain a depth block from a reference view.

In the HTM 5.1 test model, there exists a process to derive a disparity vector predictor, known as NBDV (Neighboring Block Disparity Vector). Let (dvx, dvy) denote the disparity vector identified from the NBDV function, and the current block position is (blockx, blocky). It was proposed to fetch a depth block at (blockx+dvx, blocky+dvy) in the depth image of the reference view. The fetched depth block would have the same size of the current prediction unit (PU), and it would then be used to do backward warping for the current PU. FIG. 6 illustrates the steps for locating a depth block from the reference view and then using the depth block for BVSP prediction.

In the example of FIG. 6, depth picture 150 and texture picture 154 correspond to the same view, while texture picture 152 corresponds to a different view. In particular, texture picture 152 includes current block 160 being coded relative to texture picture 154, acting as a reference picture.

A video coder may refer to neighboring block 162, which neighbors current block 160. Neighboring block 162 includes a previously determined disparity vector 166. Disparity vector 166 may be derived as a disparity vector 164 for current block 160. Thus, disparity vector 164 refers to depth block 156 in depth picture 150 of the reference view.

The video coder may then use pixels (that is, depth values) of depth block 156 to determine disparity values 168 for pixels (that is, texture values) of current block 160, for performing backward warping. The video coder may then synthesize values for a predicted block (i.e., a BVSP reference block) for current block 160 from the pixels identified by disparity values 168. The video coder may then predict current block 160 using this predicted block. For instance, during video encoding by video encoder 20, video encoder 20 may calculate pixel-by-pixel differences between the predicted block and current block 160 to produce a residual value, which video encoder 20 may then transform, quantize, and entropy encode. On the other hand, during video decoding by video decoder 30, video decoder 30 may entropy decode, inverse quantize, and inverse transform residual data, then combine the residual data (on a pixel-by-pixel basis) with the predicted block to reproduce current block 160.

JCT3V-00152 proposed changes to the BVSP techniques of 3D-HEVC, as described below. In particular, italicized text represents text added to 3D-HEVC, while bracketed text preceded by "removed:" represents deletions from 3D-HEVC: If BVSP is enabled in the sequence, the NBDV process for inter-view motion prediction is changed and the differences are highlighted in the following paragraphs:

For each of the temporal neighboring blocks, if it uses a disparity motion vector, the disparity motion vector is returned as the disparity vector and it is further refined with the method described in Section 1.6.1.3 of 3D-HEVC.

For each of the spatial neighboring blocks, the following apply:

For reference picture list 0 and reference picture list 1 in order:

If it uses a disparity motion vector, the disparity motion vector is returned as the disparity vector and it is further refined with the method described in Section 1.6.1.3.

Otherwise, if it uses BVSP mode, the associated motion vector is returned as the disparity vector. It is further refined in a similar way as described in Section 1.6.1.3. However, the maximum depth value is selected from all pixels of the corresponding depth block rather than four corner pixels and the vertical component of the refined disparity vector is set to 0.

For each of the spatial neighboring blocks, if it uses an IDV, the IDV is returned as the disparity vector and it is further refined with the method described in Section 1.6.1.3.

The introduced BVSP mode is treated as a special inter-coded mode, and a flag indicating the usage of BVSP mode may be maintained for each PU. Rather than signalling the flag in the bitstream, a new merging candidate (BVSP merging candidate) was added to the merge candidate list. The flag is dependent on whether the decoded merge candidate index corresponds to a BVSP merging candidate. The BVSP merging candidate is defined, per JCT3V-00152, as follows:

Reference picture index for each reference picture list: −1
Motion vector for each reference picture list: the refined disparity vector In JCT3V-00152, the inserted position of the BVSP merging candidate is dependent on the spatial neighboring blocks, as discussed below:

If any of the five spatial neighboring blocks (A0, A1, B0, B1, or B2, shown in FIG. 5) is coded with the BVSP mode, i.e., the maintained flag of the neighboring block is equal to 1, BVSP merging candidate is treated as the corresponding spatial merging candidate and inserted to the merge candidate list. BVSP merging candidate will only be inserted to the merge candidate list once.

Otherwise (none of the five spatial neighboring blocks are coded with the BVSP mode), the BVSP merging candidate is inserted to the merge candidate list just before the temporal merging candidates.

It is noted that during the combined bi-predictive merging candidate derivation process, additional conditions may be checked to avoid including the BVSP merging candidate.

JCT3V-J0152 further provided that each BVSP coded PU with its size denoted by N×M is further partitioned into several sub-regions with the size equal to K×K (wherein K may be 4 or 2). For each sub-region, a separate disparity motion vector is derived, and each sub-region is predicted from one block located by the derived disparity motion vector in the inter-view reference picture. In other words, the size of motion-compensation unit for BVSP coded PUs are set to K×K. In common test conditions, K is set to 4.

JCT3V-J0152 further provides that for each sub-region (4×4 block) within one PU coded with BVSP mode, a corresponding 4×4 depth block is firstly located in the reference depth view with the refined disparity vector aforementioned above. Secondly, the maximum value of the sixteen depth pixels in the corresponding depth block is selected. Thirdly, the maximum value is converted to the horizontal component of a disparity motion vector. The vertical component of the disparity motion vector is set to 0.

In 3D-HEVC, when the texture firstly coding order is applied, for each prediction unit (PU), a disparity vector could be derived from NBDV with/without the consideration the depth values in the reference depth view. After a disparity vector is obtained, it would be further refined for each 4×4 sub-region of one PU, if the PU is coded with BVSP mode.

3D-HEVC describes the refinement process as including two steps: 1) select one maximum depth value from the 4×4 depth block in the reference depth view which is located by the derived disparity vector; 2) convert the depth value to a horizontal component of the refined disparity vector while keeping the vertical component of the refined disparity vector to be 0. After the disparity vector is refined for one 4×4 sub-region of one PU, 3D-HEVC provides that the refined disparity vector is used to locate one block in the reference texture view for motion compensation.

NBDV in 3D-AVC will now be discussed. According to some 3D coding techniques, MB-level NBDV may be used to derive a disparity vector for the current MB and further used for motion vector prediction. Once a disparity motion vector is identified, i.e., one of the temporal or spatial neighboring block uses the inter-view reference picture, it is returned as the disparity vector for current MB.

According to some 3D coding techniques, the disparity vector derived from NBDV can be further refined by accessing the corresponding depth block. For example, the depth values of the four corner of the depth block of the reference view (identified by the disparity vector) can be used and the maximum depth value is chosen and converted to a disparity vector. According to other 3D coding techniques, BVSP is utilized in a way for each 4×4 or 8×8 block, the corresponding depth block is used to produce the disparity motion vector. Similar to the disparity vector derivation process, the four corners of the depth block (identified by the refined disparity vector) can be used and the maximum depth value is chosen to be converted to a disparity motion vector.

The techniques of this disclosure may address several potential problems. As one example, for D-MVP in the inter mode, the depth-to-DV conversion needs to be performed multiple times to derive DVs for various partition blocks in one MB, which increases number of depth samples to be accessed from the memory when the current MB is divided into partitions/sub-blocks. As another example, for D-MVP in Skip/Direct mode, a disparity vector is derived for a MB by taking the maximum depth value of four corner samples of the associated depth block; this requires high memory access bandwidth. As another example, in BVSP mode, a disparity vector is derived for a sub-region of size K×K by taking the maximum of four corner depth samples of the associated depth block of current sub region; this is done at the cost of high memory access bandwidth. As another example, for the Skip/direct MBs, when the inter-view motion vector is not available, the conventional median-based motion vector prediction is used. As another example, in 3D-HEVC, refining the disparity vector for a current block when the disparity vector is derived from an inter-view predicted neighbouring block only requires accessing the four corners of the reference depth block. Refining the disparity vector for a current block when the disparity vector is derived from a BVSP coded neighbouring block and producing a disparity motion vector for a 4×4 or 8×8 sub-region for a PU coded with BVSP mode require a slightly different design, which requires accessing all samples of the reference block.

This disclosure introduces techniques that may simplify the disparity (motion) vector derivation process, when disparity vectors are derived by accessing a depth map. The explanation of these techniques may mainly focus on 3D-AVC, although it should be understood that similar ideas may be applicable to 3D-HEVC. More specifically, this disclosure provides a simplified and unified disparity vector derivation scheme for various inter prediction modes (including Skip/direct, inter) as well as BVSP modes, when a depth-to-disparity conversion scheme is utilized. The calculations and memory accesses may be simplified.

Figure 7:
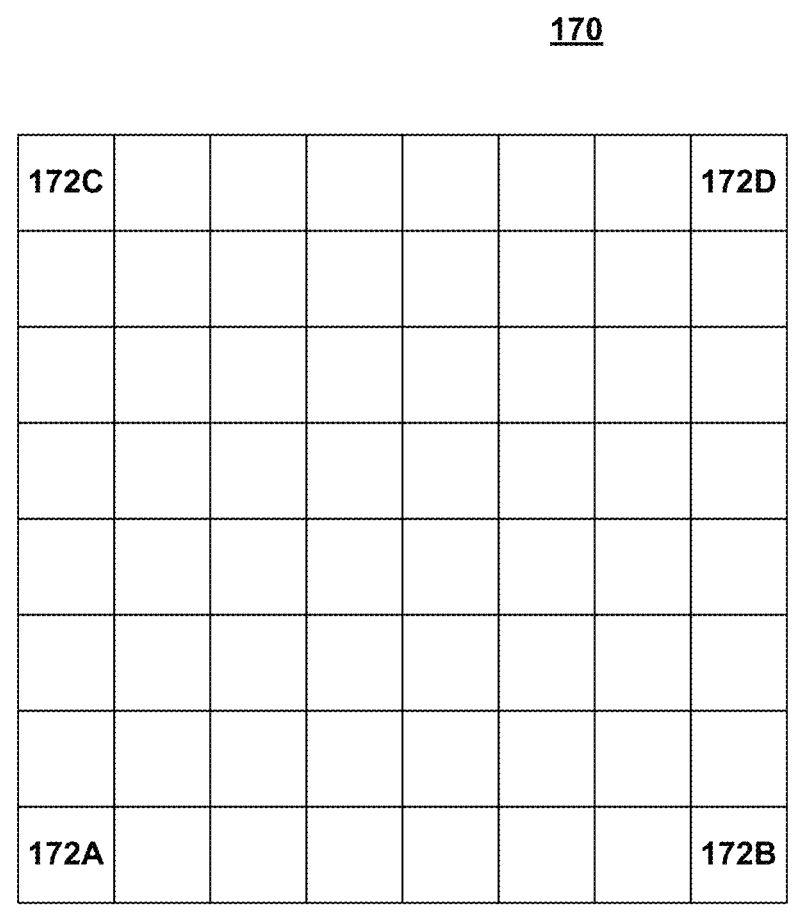

FIG. 7 shows an example of an 8×8 depth block 170. The four corner samples of depth block 170 are labeled 172A-172D. A "reduced_resolution_flag" in the bitstream may indicate if a depth view has a reduced resolution relative to the texture view or if the depth view has the same resolution as the texture view. If reduced_resolution_flag is equal to 1, then a 16×16 macroblock in a texture view will have a corresponding (i.e., co-located) 8×8 depth block, such as 8×8 depth block 170, in a corresponding texture view. If reduced_resolution_flag is equal to 0, then a 16×16 macroblock in a texture view will have a corresponding (i.e., co-located) 16×16 depth block in a corresponding texture view. Several examples below will be explained by making reference to depth block 170.

According to one technique of this disclosure, when coding a non-base texture view component, video decoder 30 may derive only one disparity vector for a whole macroblock by accessing a depth block corresponding to the macroblock containing the current texture block. Regardless of whether the current MB is coded with skip/direct modes or other inter modes, whenever a disparity vector is required for any block within the MB, video decoder 30 may derive the same unique disparity vector once from the same MB level disparity vector derivation. Video decoder 30 may, for example, derive the disparity vector by accessing the depth values of corner samples 172A-172D and determining a maximum depth value from the four corner samples. Video decoder 30 may then convert the maximum depth value into a disparity value using, for example, a look up table or equations (1) and (2) above. In some implementations, video decoder 30 may derive a disparity vector by accessing depth values other than the four corner samples and/or by identifying a value other than the maximum.

As one example, for a macroblock of a non-base texture view, video decoder 30 may locate a depth block that corresponds to the macroblock, and based on at least one depth value of the depth block, derive a disparity vector for the macroblock. Video decoder 30 may code a first sub-block of the macroblock based on the derived disparity vector and code a second sub-block of the macroblock based on the derived disparity vector. The depth block and macroblock may be co-located. Video decoder 30 may derive the disparity vector for the macroblock by determining a set of depth values that includes depth values of two or more corner samples of the depth block, and identify from the set of depth values, a maximum depth value. Video decoder 30 may, for example, code the first sub-block using one of a skip mode and a direct mode and code the second sub-block using an inter prediction mode other than the skip mode or the direct mode.

One potential difference between skip/direct modes and inter-prediction is then when a macroblock) is coded using skip/direct modes, there will not be any partitioning, i.e., MB size of 16×16 is coded fully. When a MB is coded using a mode other than skip/direct (i.e., inter modes), there may be MB partitioning. Also, each MB partition may be further partitioned into sub-blocks (i.e. H.264/AVC sub-blocks). According to the techniques of this disclosure, the same disparity vector derived for the MB may be used for all the modes, such as skip/direct and inter-modes.

According to another technique of this disclosure, when deriving a disparity vector from a corresponding depth block of the depth view component within the same view, only the bottom-left (172A) and bottom-right (172B) corner depth samples of the corresponding depth block of the current MB are accessed. As shown in FIG. 7, typically a MB corresponds to an 8×8 reference block in the same view in 3D-AVC. The depth block typically has a lower spatial resolution (with horizontal and vertical downsamped by half). Thus, a 16×16 macroblock corresponds to an 8×8 depth block. According to one technique of this disclosure, only corner samples 172A and 172B are accessed to derive the disparity vector for the whole MB. Furthermore, the maximum depth value of the accessed depth samples is used for converting it to a disparity vector. Alternatively, only the top-left (172C) and bottom-right (172B) corner samples of the reference depth block are accessed. Alternatively, only the top-left (172C) and top-right (172D) corner samples of the reference depth block are accessed. Alternatively, only the bottom-left (172A) and bottom-right (172B) corner samples of the reference depth block are accessed. Alternatively, only the bottom-left (172A) and top-right (172D) corner samples of the reference depth block are accessed. Alternatively, only the bottom-right (172B) and top-right (172D) corner samples of the reference depth block are accessed. Alternatively, any other two samples located within the corresponding depth block are accessed, for example, one center pixel and one corner pixels or two center pixels etc. Alternatively, when two samples are accessed, the average/minimum of these two depth samples can be used, instead of maximum.

According to another technique of this disclosure, similar depth-to-disparity conversion methodology may be used in the BVSP modes in order to derive a disparity vector for each sub-region of size K×K within a MB partition. A reference depth block is firstly identified for a K×K sub-region, and the same corner samples with positions in a relative coordination (e.g., bottom-right and bottom-left corners of the reference depth block corresponding/co-located to the K×K sub-region) of the reference depth block, similar to those in MB level disparity vector derivation are accessed. Alternatively, fewer corner samples of a reference depth block may be accessed for BVSP.

According to another technique of this disclosure, in skip/direct modes of the current 3D-AVC, when the inter-view motion vector is unavailable, the motion vector predictor is set to be the motion vector of the first available spatial neighbour, including the reference index, instead of using the medium of motion vectors of three neighboring blocks. Check in order, if any of the spatial neighbours has the reference picture index greater than or equal 0. If true, the motion vector and the reference picture index of the current MB are set respectively to be equal to the motion vector and the reference index of the spatial neighboring block, and the checking process terminates.

According to another technique of this disclosure, when NBDV is used for 3D-AVC and the depth map of the reference view is used to refine the disparity vector, the same two corner samples can be used to get one optimal depth value to be converted to a refined disparity vector.

According to another technique of this disclosure, when NBDV is used for 3D-AVC and the depth map of the reference view is used to produce disparity motion vectors in BVSP mode, the same two corner samples can be used to get one optimal depth value to be converted to a disparity motion vector.

According to another technique of this disclosure, in 3D-HEVC, similarly, accessing the reference block for a disparity motion vector in BVSP mode can be aligned in a way by just checking the corner samples of the neighboring blocks. In other words, for each K×K sub-region, video decoder 30 checks only the corner samples of the reference depth block of the K×K sub-region identified by a disparity vector of the prediction unit containing the K×K sub-region. Furthermore, the simplifications as described above can be applicable to 3D-HEVC, by applying refinement to a PU or CU instead of a MB block.

Aspects of implementing the techniques described above will now be explained in greater detail, beginning with disparity vector derivation in the Skip/direct mode. For this example, the location of the top-left sample of the current MB relative to the current picture is denoted by (x, y). One depth value (D) is selected for the current MB from the bottom-left and bottom-right corner pixels in the reference depth view as $$D=\max(D0,D1),$$

where the function max(•) returns the maximum value of Di (i being 0 to 1) and Di denotes the depth value at the i-th pixel location that is calculated as $$i=0{:}(x\text{>>reduced\_resolution\_flag},$$
$$(y\text{>>reduced\_resolution\_flag})+\text{SMD\_POS}),$$

$$i=1{:}((x\text{>>reduced\_resolution\_flag})+\text{SMD\_POS},$$
$$(y\text{>>reduced\_resolution\_flag})+\text{SMD\_POS}),$$

here, SMD_POS is equal to 7 and 15 when the "reduced_resolution_flag," respectively is equal to 1 and 0. "reduced_resolution_flag" equal to 1 specifies that the depth view components of a view component pair have a lower spatial resolution than the luma component of the texture view component of the same view component pair, and the width and height of the depth view components are both half of the width and height of all the texture view components. "reduced_resolution_flag" equal to 0 specifies that when both depth view components and texture view components are present, they have the same spatial resolution. Finally, the horizontal component of the disparity vector is calculated from the selected depth value D using Eq. (1) and (2) and the vertical component of the disparity vector is always set to 0.

Disparity vector derivation in the inter mode will now be described. In this example, the top-left position of current MB (where the current partition/sub-block is located) relative to the current picture is denoted by (x, y). One depth value (D) is selected for the current MB from the bottom-left and bottom-right corner pixels in the reference depth view as $$D=\max(D0,D1),$$

where the function max(•) returns the maximum value of Di (i being 0 to 1) and Di denotes the depth value at the i-th pixel location that is calculated as $$i=0:(x>>\text{reduced\_resolution\_flag},$$
$$(y>>\text{reduced\_resolution\_flag})+\text{SMD\_POS}),$$

$$i=1:((x>>\text{reduced\_resolution\_flag})+\text{SMD\_POS},$$
$$(y>>\text{reduced\_resolution\_flag})+\text{SMD\_POS}),$$

here, SMD_POS and reduced_resolution_flag function as described above. Finally, the horizontal component of the disparity vector is calculated from the selected depth value D using Eq. (1) and (2), or a look up table, and the vertical component of the disparity vector may be set to 0.

Disparity vector derivation in the BVSP mode will now be described. The size of the sub-region by K×K (where K could be 8 or 4), the top-left position of one sub-region within current MB partition relative to current picture is denoted by (x, y). One depth value (D) is selected for each sub-region of size K×K from the bottom-left and bottom-right corner pixels in the reference depth view as $$D=\max(D0,D1),$$

where the function max(•) returns the maximum value of Di (i being 0 to 1) and Di denotes the at i-th depth pixel location at:

$$i=0:((x>>\text{reduced\_resolution\_flag}),$$
$$(y>>\text{reduced\_resolution\_flag})+\text{VSP\_S})$$

$$i=1:((x>>\text{reduced\_resolution\_flag})+\text{VSP\_S},$$
$$(y>>\text{reduced\_resolution\_flag})+\text{VSP\_S})$$

here, VSP_S is computed as:

$$\text{VSP\_S}=(K>>\text{reduced\_resolution\_flag})-1,$$

and the reduced_resolution_flag functions as defined above. Finally, the horizontal component of the disparity vector may be calculated from the selected depth value D using Eq. (1) and (2), or look up tables, and the vertical component of the disparity vector may be set to 0.

MVP in the Skip/direct modes when inter-view motion is not available will now be discussed. In this example, the motion vectors Mvc_X[i] and reference indices Ric_X[i] (for X equal to 0 and 1) with i equal 0, 1 and 2 are denoted respective to the spatial neighbors A, B and C of the current MB. When the reference block in the base view corresponding to the current Skip/direct MB is encoded in the intra mode, the predicated motion vector (Mvp0, Mvp1) and the reference index (Ri0, Ri1) for the current MB is calculated as follows:
1. initialize both the Mvp0, Mvp1 equal to the zero motion vector [0,0] and reference index Ri0, Ri1 is set equal to −1.
2. When all the spatial candidate neighbors has the reference index equal to −1 (i.e., Ric_0[i]=−1 and, Ric_1[i]=−1, for all i=0, 1, 2), then the motion vector and the reference index of the current MB is set to zero.
3. For i being 0 to 2, the following apply:
   If the i-th (i=0, 1, 2) spatial neighbor has the reference index greater than or equal to zero, set the predicted motion vector Mvp0 and Mvp1 to be equal to the motion vector MvC_0[i] and MvC_1[i], respectively. Further, the reference index Ri0 and Ri1 are set equal to the reference index Ric_0[i] and Ric_1 [i], respectively.

Figure 8:
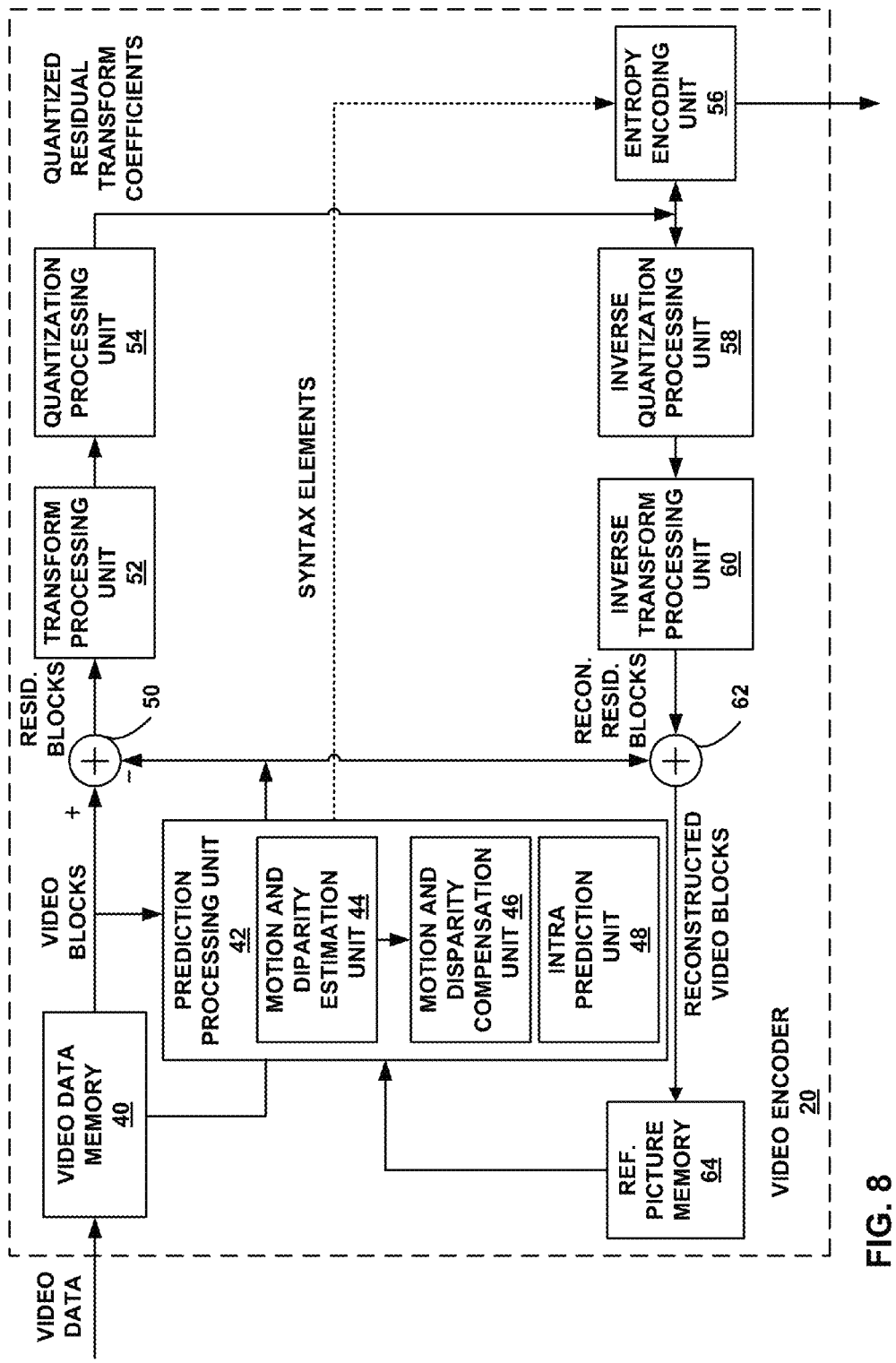
FIG. 8 is a block diagram illustrating an example video encoder that may implement the techniques described in this disclosure.

FIG. 8 is a block diagram illustrating an example of a video encoder that may implement the techniques described in this disclosure. For example, FIG. 8 illustrates video encoder 20 which may represent either a 3D-AVC compliant or a 3D-HEVC compliant video encoder. Video encoder 20 will be described using certain HEVC terminology such as PUs, TUs, and CUs, but it should be understood that the techniques described with reference to video encoder 20 may also be performed with video coded according to the H.264 standard.

Video encoder 20 may perform intra- and inter-coding of video blocks within video slices. For example, video encoder 20 may perform inter-prediction encoding or intra-prediction encoding. Intra-coding relies on spatial prediction to reduce or remove spatial redundancy in video within a given video frame or picture. Inter-coding relies on temporal prediction or inter-view prediction to reduce or remove temporal redundancy within adjacent frames or pictures of a video sequence or redundancy between pictures in different views. Intra-mode (I mode) may refer to any of several spatial based compression modes. Inter-modes, such as uni-directional prediction (P mode) or bi-prediction (B mode), may refer to any of several temporal-based compression modes.

In the example of FIG. 8, video encoder 20 includes video data memory 40, prediction processing unit 42, reference picture memory 64, summer 50, transform processing unit 52, quantization processing unit 54, and entropy encoding unit 56. Prediction processing unit 42 includes motion and disparity estimation unit 44, motion and disparity compensation unit 46, and intra-prediction unit 48. For video block reconstruction, video encoder 20 also includes inverse quantization processing unit 58, inverse transform processing unit 60, and summer 62. A deblocking filter (not shown in FIG. 8) may also be included to filter block boundaries to remove blockiness artifacts from reconstructed video. If desired, the deblocking filter would typically filter the output of summer 62. Additional loop filters (in loop or post loop) may also be used in addition to the deblocking filter.

Video data memory 40 may store video data to be encoded by the components of video encoder 20. The video data stored in video data memory 40 may be obtained, for example, from video source 18. Reference picture memory 64 is one example of a decoding picture buffer (DPB that stores reference video data for use in encoding video data by video encoder 20 (e.g., in intra- or inter-coding modes, also referred to as intra- or inter-prediction coding modes). Video data memory 40 and reference picture memory 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 40 and reference picture memory 64 may be provided by the same memory device or separate memory devices. In various examples, video data memory 40 may be on-chip with other components of video encoder 20, or off-chip relative to those components.

Video encoder 20 receives video data, and a partitioning unit (not shown) partitions the data into video blocks. This partitioning may also include partitioning into slices, tiles, or other larger units, as wells as video block partitioning (e.g., macroblock partitions and sub-blocks of partitions). Video encoder 20 generally illustrates the components that encode video blocks within a video slice to be encoded. The slice may be divided into multiple video blocks (and possibly into sets of video blocks referred to as tiles). Prediction processing unit 42 may select one of a plurality of possible coding modes, such as one of a plurality of intra coding modes (intra-prediction coding modes) or one of a plurality of inter coding modes (inter-prediction coding modes), for the current video block based on error results (e.g., coding rate and the level of distortion). Prediction processing unit 42 may, for example, select a BVSP mode to code a current block. Prediction processing unit 42 may provide the resulting intra- or inter-coded block to summer 50 to generate residual block data and to summer 62 to reconstruct the encoded block for use as a reference picture.

Intra-prediction unit 48 within prediction processing unit 42 may perform intra-predictive coding of the current video block relative to one or more neighboring blocks in the same frame or slice as the current block to be coded to provide spatial compression. Motion and disparity estimation unit 44 and motion and disparity compensation unit 46 within prediction processing unit 42 perform inter-predictive coding of the current video block relative to one or more predictive blocks in one or more reference pictures to provide temporal compression.

Motion and disparity estimation unit 44 may be configured to determine the inter-prediction mode for a video slice according to a predetermined pattern for a video sequence. The predetermined pattern may designate video slices in the sequence as P slices or B slices. Motion and disparity estimation unit 44 and motion and disparity compensation unit 46 may be highly integrated, but are illustrated separately for conceptual purposes. Motion estimation, performed by motion and disparity estimation unit 44, is the process of generating motion vectors, which estimate motion for video blocks. A motion vector, for example, may indicate the displacement of a video block within a current video frame or picture relative to a predictive block within a reference picture.

A predictive block is a block that is found to closely match the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion and disparity estimation unit 44 may perform a motion search relative to the full pixel positions and fractional pixel positions and output a motion vector with fractional pixel precision.

Motion and disparity estimation unit 44 calculates a motion vector for a video block in an inter-coded (inter-prediction coded) slice by comparing the position of the video block to the position of a predictive block of a reference picture. The reference picture may be selected from a first reference picture list (RefPicList0) or a second reference picture list (RefPicList1), each of which identify one or more reference pictures stored in reference picture memory 64. Motion and disparity estimation unit 44 sends the calculated motion vector to entropy encoding unit 56 and motion and disparity compensation unit 46.

Motion compensation, performed by motion and disparity compensation unit 46, may involve fetching or generating the predictive block based on the motion vector determined by motion estimation, possibly performing interpolations to sub-pixel precision. Upon receiving the motion vector for the current video block, motion and disparity compensation unit 46 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion and disparity compensation unit 46 may also generate syntax elements associated with the video blocks and the video slice for use by video decoder 30 in decoding the video blocks of the video slice.

In some examples, motion and disparity compensation unit 46 may perform BVSP for a current block in a current view. That is, motion and disparity compensation unit 46 may determine a picture of reference picture memory 64 in a first view. As explained in greater detail above, motion and disparity compensation unit 46 may determine a disparity vector for the current block by accessing a corresponding block in a depth view. Then, using depth values of the depth block, motion and disparity compensation unit 46 may warp pixel values of a picture in the first view, determined relative to positions of pixels in the current block, such that a predicted block is formed in a second view, different from the first view and the current view. Motion and disparity compensation unit 46 may provide this predicted block to summer 50 and summer 62, for use in calculating a residual and in reproducing the current block, respectively. Likewise, in accordance with the techniques of this disclosure, video encoder 20 may encode syntax data defining motion information for the current block such that the motion information includes a reference index having a value that identifies the picture in the first view from which the predicted block (i.e., a BVSP reference block) is synthesized.

Intra-prediction unit 48 may intra-predict a current block, as an alternative to the inter-prediction performed by motion and disparity estimation unit 44 and motion and disparity compensation unit 46, as described above. In particular, intra-prediction unit 48 may determine an intra-prediction mode to use to encode a current block. In some examples, intra-prediction unit 48 may encode a current block using various intra-prediction modes, e.g., during separate encoding passes, and intra-prediction unit 48 (or a mode select unit, in some examples) may select an appropriate intra-prediction mode to use from the tested modes. For example, intra-prediction unit 48 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction unit 48 may calculate ratios from the distortions and rates for the various encoded blocks to determine which intra-prediction mode exhibits the best rate-distortion value for the block.

In any case, after selecting an intra-prediction mode for a block, intra-prediction unit 48 may provide information indicative of the selected intra-prediction mode for the block to entropy encoding unit 56. Entropy encoding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 42 generates the predictive block for the current video block via either inter-prediction or intra-prediction, video encoder 20 forms a residual video block by subtracting the predictive block from the current video block. The residual video data in the residual block may be applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization processing unit 54. Quantization processing unit 54 quantizes the transform coefficients to further reduce bit rate. The quantization process may reduce the bit depth associated with some or all of the coefficients. The degree of quantization may be modified by adjusting a quantization parameter. In some examples, quantization processing unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization processing unit 58 and inverse transform processing unit 60 apply inverse quantization and inverse transformation, respectively, to reconstruct the residual block in the pixel domain for later use as a reference block of a reference picture. Motion and disparity compensation unit 46 may calculate a reference block by adding the residual block to a predictive block of one of the reference pictures within one of the reference picture lists. Motion and disparity compensation unit 46 may also apply one or more interpolation filters to the reconstructed residual block to calculate sub-integer pixel values for use in motion estimation. Summer 62 adds the reconstructed residual block to the motion compensated prediction block produced by motion and disparity compensation unit 46 to produce a reference block for storage in reference picture memory 64. The reference block may be used by motion and disparity estimation unit 44 and motion and disparity compensation unit 46 as a reference block to inter-predict a block in a subsequent video frame or picture.

In this manner, video encoder 20 is an example of a video encoder that may be configured to implement one or more example techniques described in this disclosure. For example, video data memory 40 stores video data. The video data may include a texture video component of a dependent view and a depth view component that corresponds to the texture view component, each of which video encoder 20 is to encode in a 3D-AVC compliant or 3D-HEVC compliant video coding process.

In the techniques described in this disclosure, video encoder 20 may include one or more processors that are configured to encode, in a 3D-AVC compliant or 3D-HEVC compliant video coding process, a texture view component of a dependent view of the video data. As described above, each view in a 3D-AVC includes a texture view component and depth view component. There is one base view and one or more enhancement or dependent views in 3D-AVC, where texture view components of the one or more enhancement or dependent views may be inter-view predicted.

To encode the texture view component, video encoder 20 may be configured to evaluate motion information of one or more neighboring blocks of a current block in the texture view component to determine whether at least one neighboring block is inter-view predicted with a disparity motion vector that refers to an inter-view reference picture in a view other than the dependent view. Video encoder 20 may derive a disparity vector for the current block based on the disparity motion vector for one of the neighboring blocks. For texture-first coding, video encoder 20 may encode a depth view component, of the video data, that corresponds to the texture view component subsequent to encoding the texture view component.

In some examples, prediction processing unit 42 of video encoder 20 may be one example of a processor configured to implement the examples described in this disclosure for disparity vector derivation and BVSP coding. In some examples, a unit (e.g., one or more processors) other than prediction processing unit 42 may implement the examples described above. In some examples, prediction processing unit 42 in conjunction with one or more other units of video encoder 20 may implement the examples described above. In some examples, a processor of video encoder 20 (not shown in FIG. 8) may, alone or in conjunction with other processors of video encoder 20, implement the examples described above.

Figure 9:
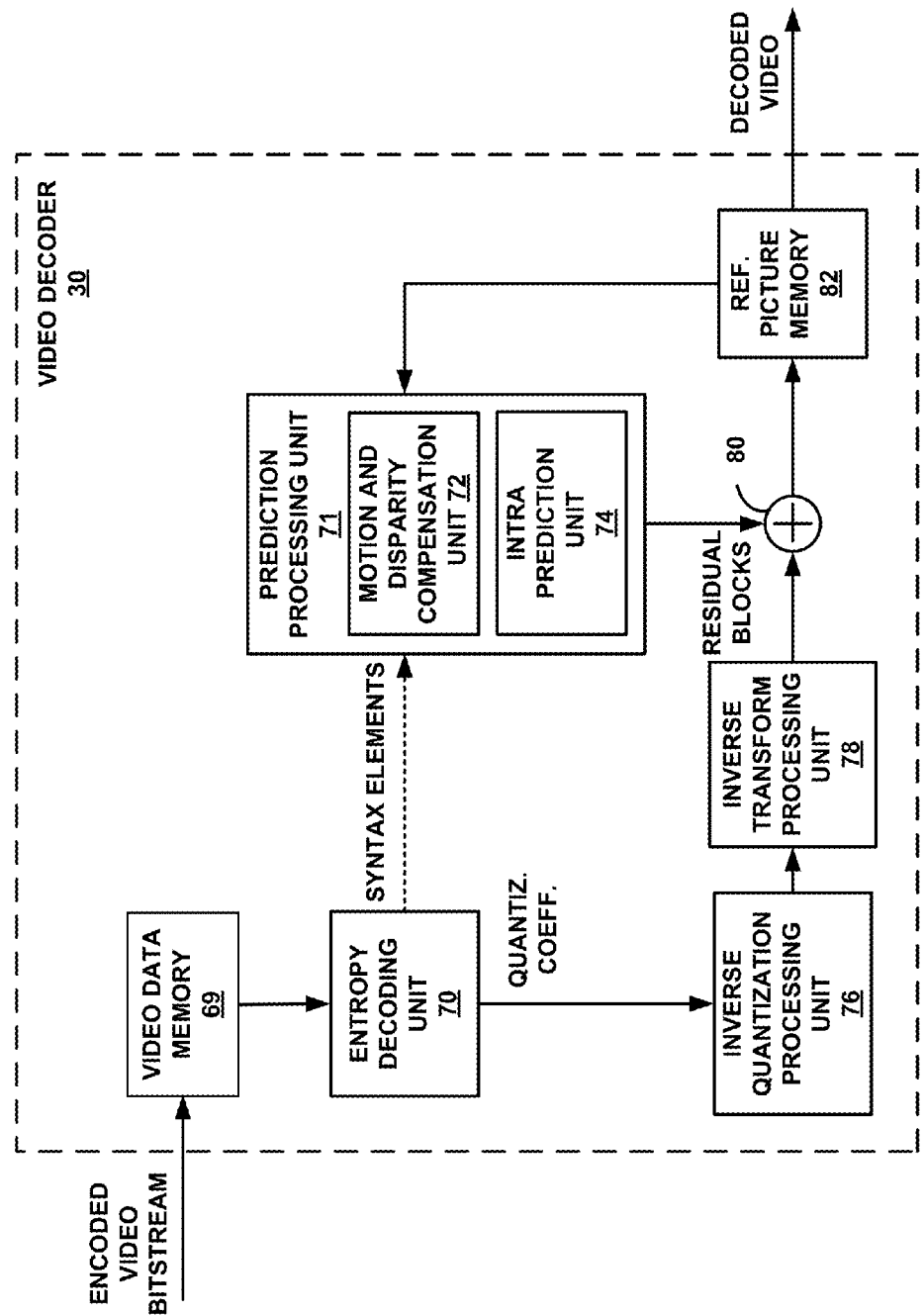
FIG. 9 is a block diagram illustrating an example video decoder that may implement the techniques described in this disclosure.

FIG. 9 is a block diagram illustrating an example of a video decoder that may implement the techniques described in this disclosure. FIG. 9 is a block diagram illustrating an example of a video decoder that may implement the techniques described in this disclosure. For example, FIG. 9 illustrates video decoder 30 which may represent either a 3D-AVC compliant or a 3D-HEVC compliant video decoder. Video decoder 30 will be described using certain HEVC terminology such as PUs, TUs, and CUs, but it should be understood that the techniques described with reference to video decoder 30 may also be performed with video coded according to the H.264 standard.

Video decoder 30 may perform inter-prediction decoding or intra-prediction decoding. FIG. 9 illustrates video decoder 30. In the example of FIG. 9, video decoder 30 includes video data memory 69, entropy decoding unit 70, prediction processing unit 71, inverse quantization processing unit 76, inverse transform processing unit 78, summer 80, and reference picture memory 82. Prediction processing unit 71 includes motion and disparity compensation unit 72 and intra-prediction unit 74. Video decoder 30 may, in some examples, perform a decoding pass generally reciprocal to the encoding pass described with respect to video encoder 20 from FIG. 8.

Video data memory 69 may store video data, such as an encoded video bitstream, to be decoded by the components of video decoder 30. The video data stored in video data memory 69 may be obtained, for example, from storage device 34, from a local video source, such as a camera, via wired or wireless network communication of video data, or by accessing physical data storage media. Video data memory 69 may form a coded picture buffer (CPB) that stores encoded video data from an encoded video bitstream.

Reference picture memory 82 is one example of a decoded picture buffer (DPB) that stores reference video data for use in decoding video data by video decoder 30 (e.g., in intra- or inter-coding modes). Video data memory 69 and reference picture memory 82 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 69 and reference picture memory 82 may be provided by the same memory device or separate memory devices. In various examples, video data memory 69 may be on-chip with other components of video decoder 30, or off-chip relative to those components.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors, and other syntax elements. Entropy decoding unit 70 forwards the motion vectors and other syntax elements to prediction processing unit 71. Video decoder 30 may receive the syntax elements at the video slice level and/or the video block level.

When the video slice is coded as an intra-coded (I) slice, intra-prediction unit 74 of prediction processing unit 71 may generate prediction data for a video block of the current video slice based on a signaled intra-prediction mode and data from previously decoded blocks of the current frame or picture. When the video frame is coded as an inter-coded (i.e., B or P) slice, motion and disparity compensation unit 72 of prediction processing unit 71 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference picture lists (RefPicList0 and RefPicList1) using default construction techniques based on reference pictures stored in reference picture memory 82.

Motion and disparity compensation unit 72 determines prediction information for a video block of the current video slice by parsing the motion vectors and other syntax elements, and uses the prediction information to produce the predictive blocks for the current video block being decoded. For example, motion and disparity compensation unit 72 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion and disparity compensation unit 72 may also perform interpolation based on interpolation filters. Motion and disparity compensation unit 72 may use interpolation filters as used by video encoder 20 during encoding of the video blocks to calculate interpolated values for sub-integer pixels of reference blocks. In this case, motion and disparity compensation unit 72 may determine the interpolation filters used by video encoder 20 from the received syntax elements and use the interpolation filters to produce predictive blocks.

Motion and disparity compensation unit 72 may perform backward view synthesis prediction for a current block in a current view. That is, motion and disparity compensation unit 72 may determine a picture of reference picture memory 82 in a first view. As explained in greater detail above, motion and disparity compensation unit 72 may determine a depth block corresponding to the current block, and using depth values of the depth block, motion and disparity compensation unit 72 may warp pixel values of a picture in the first view, determined relative to positions of pixels in the current block, such that a predicted block (i.e., a BVSP reference block) is formed in a second view, different from the first view and the current view. Motion and disparity compensation unit 72 may provide this predicted block to summer 50 and summer 80, for use in calculating a residual and in reproducing the current block, respectively. Likewise, in accordance with the techniques of this disclosure, video decoder 30 may decode syntax data defining motion information for the current block such that the motion information includes a reference index having a value that identifies the picture in the first view from which the predicted block is synthesized.

Inverse quantization processing unit 76 inverse quantizes (i.e., de-quantizes), the quantized transform coefficients provided in the bitstream and decoded by entropy decoding unit 70. The inverse quantization process may include use of a quantization parameter calculated by video encoder 20 for each video block in the video slice to determine a degree of quantization and, likewise, a degree of inverse quantization that should be applied. Inverse transform processing unit 78 applies an inverse transform (e.g., an inverse DCT, an inverse integer transform, or a conceptually similar inverse transform process), to the transform coefficients in order to produce residual blocks in the pixel domain.

After motion and disparity compensation unit 72 generates the predictive block for the current video block based on the motion vectors and other syntax elements, video decoder 30 forms a decoded video block by summing the residual blocks from inverse transform processing unit 78 with the corresponding predictive blocks generated by motion and disparity compensation unit 72. Summer 80 represents the component or components that perform this summation operation. If desired, a deblocking filter may also be applied to filter the decoded blocks in order to remove blocking artifacts. Other loop filters (either in the coding loop or after the coding loop) may also be used to smooth pixel transitions, or otherwise improve the video quality. The decoded video blocks in a given picture are then stored in reference picture memory 82, which stores reference pictures used for subsequent motion compensation. Reference picture memory 82 also stores decoded video for later presentation on a display device, such as display device 32 of FIG. 1.

In this manner, video decoder 30 is an example of a video decoder that may be configured to implement one or more example techniques described in this disclosure. For example, video data memory 69 stores video data. The video data may include information from which video decoder 30 can decode a texture video component of a dependent view and a depth view component that corresponds to the texture view component, each of which video encoder 20 is encoded in a 3D-AVC compliant or 3D-HEVC compliant video coding process.

In the techniques described in this disclosure, video decoder 30 may include one or more processors that are configured to decode, in a 3D-AVC compliant or 3D-HEVC compliant video coding process, a texture view component of a dependent view of the video data. To decode the texture view component, video decoder 30 may be configured to evaluate motion information of one or more neighboring blocks of a current block in the texture view component to determine whether at least one neighboring block is inter-view predicted with a disparity motion vector that refers to an inter-view reference picture in a view other than the dependent view. Video decoder 30 may derive a disparity vector for the current block based on the disparity motion vector for one of the neighboring blocks. For texture-first coding, video decoder 30 may decode a depth view component, of the video data, that corresponds to the texture view component subsequent to decoding the texture view component.

In some examples, prediction processing unit 71 of video decoder 30 may be one example of a processor configured to implement the examples described in this disclosure for disparity vector derivation and BVSP coding. In some examples, a unit (e.g., one or more processors) other than prediction processing unit 71 may implement the examples described above. In some examples, prediction processing unit 71 in conjunction with one or more other units of video decoder 30 may implement the examples described above. In yet some other examples, a processor of video decoder 30 (not shown in FIG. 9) may, alone or in conjunction with other processors of video decoder 30, implement the examples described above.

Figure 10:
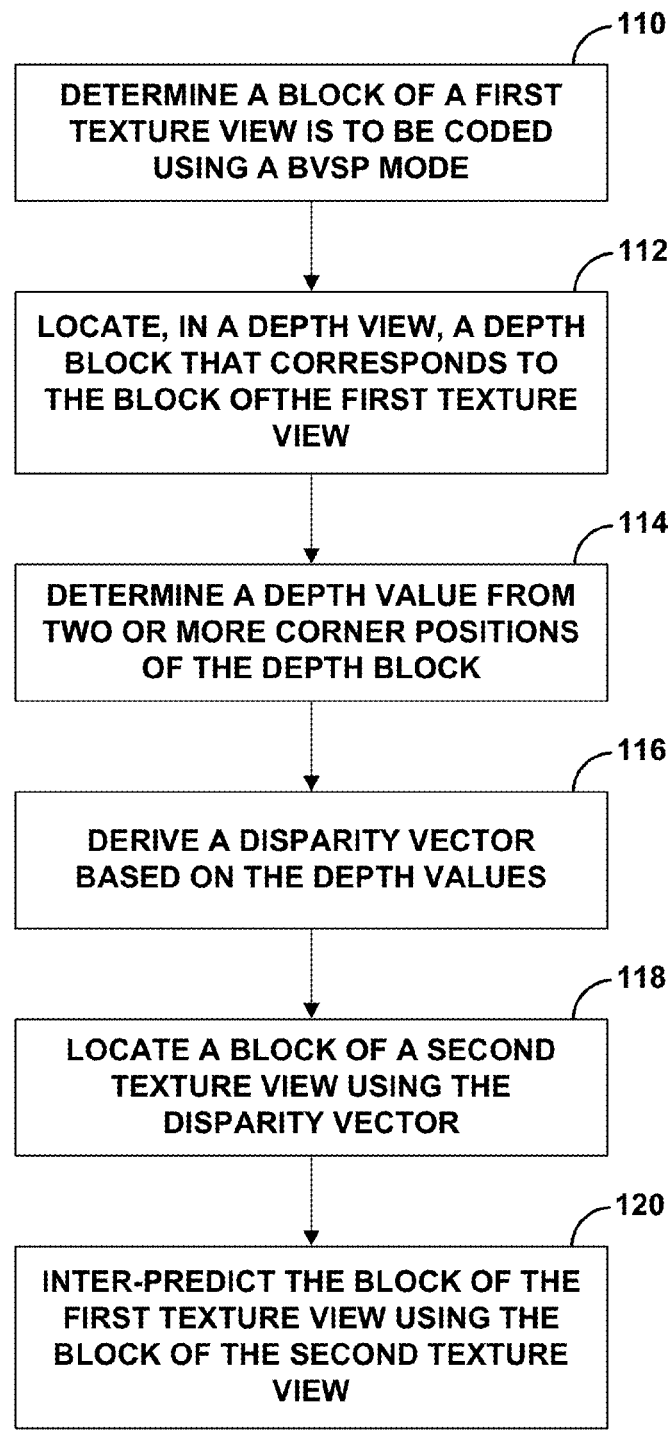
FIG. 10 is a flowchart illustrating an example operation of disparity vector derivation and inter-prediction coding in accordance with techniques described in this disclosure.

FIG. 10 is a flowchart showing an example 3D video coding process in accordance with the techniques of this disclosure. The techniques of FIG. 10 may be applicable to either 3D-AVC compliant video or to 3D-HEVC compliant video. The techniques of FIG. 10 will be described with respect to a generic video coder, which may for example be a video encoder such as video encoder 20 or a video decoder such as video decoder. The video coder determines a block of a first texture view is to be coded using a BVSP mode (110). When performing video decoding, video decoder 30 may, for example, determine that the block of the first texture view is to be decoded using the BVSP mode by receiving a syntax element that indicates the block of the first texture view is to be coded using the block-based view synthesis mode. When performing video encoding, video encoder 20 may, for example, determine the block of the first texture view is to be coded using the BVSP mode by performing several coding passes and identifying BVSP mode as a mode that produces a desired rate-distortion tradeoff.

The video coder locates, in a depth view, a depth block that corresponds to the block of the first texture view (112). In 3D-AVC, the block in this example may refer to a K×K sub-region of a macroblock or macroblock partition. In 3D-HEVC, the block may also refer to a K×K sub-region. The corresponding depth block may, for example, be a co-located depth block in 3D-AVC or may be a depth block in the reference base view (i.e., second view) that is identified by the disparity vector generated using NBDV in 3D-HEVC. The video coder determines depth values for two or more corner positions of the depth block (114). Based on the depth values, the video coder derives a disparity vector for the block (116). Using the disparity vector, the video coder locates a block of a second texture view (118). The video coder inter-predicts the block of the first texture view using the block of the second texture view (120). The first texture view may, for example, be a non-base texture view, and the second texture view may, for example, be a base texture view. When the techniques of FIG. 10 are implemented by a 3D-AVC compliant video coder, the block of the first texture view may be, for example, a sub-block of a macroblock partition. When the techniques of FIG. 10 are implemented by a 3D-HEVC compliant coder, the block of the first texture view may, for example, be a prediction unit.

Figure 11:
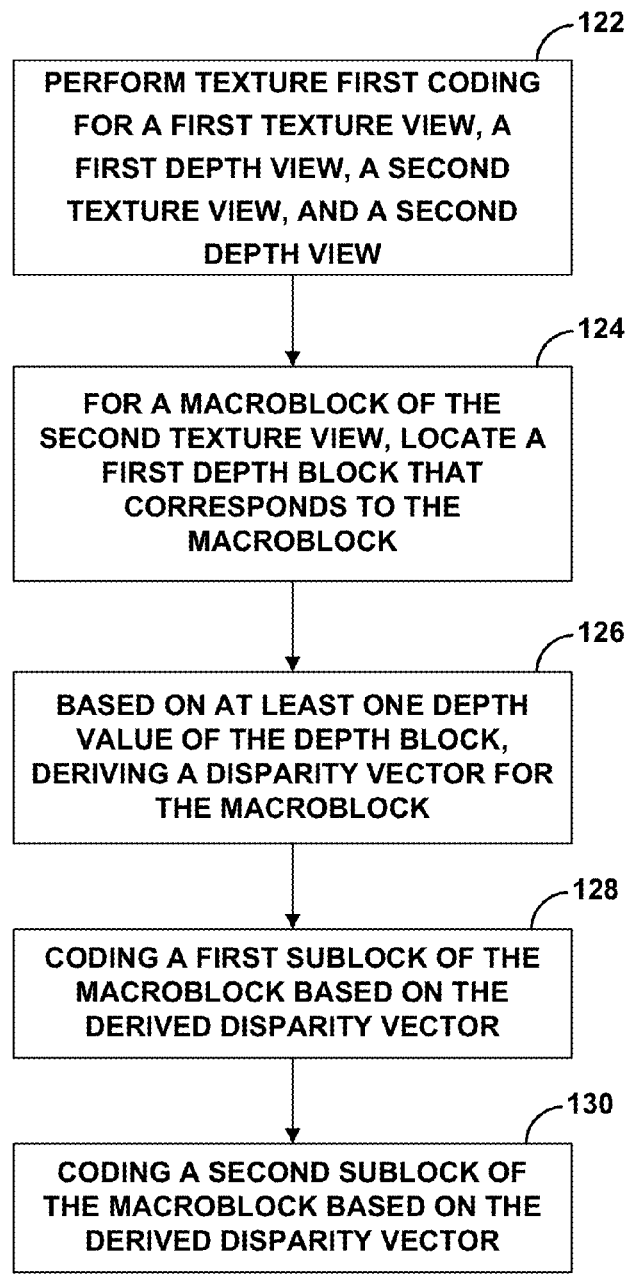
FIG. 11 is a flowchart illustrating another example operation of disparity vector derivation and inter-prediction coding in accordance with techniques described in this disclosure.

FIG. 11 is a flowchart showing an example 3D video coding process in accordance with the techniques of this disclosure. The techniques of FIG. 11 will be described using 3D-AVC terminology, but the techniques may potentially be extended to other video coding standards such as 3D-HEVC. The techniques of FIG. 11 will be described with respect to a generic video coder, which may for example be a video encoder such as video encoder 20 or a video decoder such as video decoder. The video coder performs texture first coding for a first texture view, a first depth view, a second texture view, and a second depth view (122). The first texture view and the first base depth view may, for example, be base views, while the second texture view and the second depth view are non-base views.

For a macroblock of the second texture view, the video coder locates a depth block, in the first depth view, that corresponds to the macroblock (124). Based on at least one depth value of the depth block, the video coder derives a disparity vector for the macroblock (126). The video coder may, for example, derive the disparity vector by determining a set of depth values that includes depth values of two or more corner samples of the depth block, and identify from the set of depth values, a maximum depth value. The maximum depth value may then be converted into a disparity vector based on a conversion table that converts depth values to disparity values or using some other technique. The video coder codes a first sub-block of the macroblock based on the derived disparity vector (128). The video coder codes a second sub-block of the macroblock based on the derived disparity vector (130). The video coder may, for example, code the first sub-block using one of a skip mode and a direct mode and code the second sub-block using an inter prediction mode other than the skip mode or the direct mode. In the example of FIG. 11, the sub-blocks may, for instance, be H.264/AVC sub-blocks or may be macroblock partitions.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding three-dimensional (3D) video data, the method comprising:
   determining a first block of a first texture view is to be decoded using a block-based view synthesis mode;
   determining a first disparity vector for the first block of the first texture view based on depth values of two or more corner positions of a first depth block that is collocated relative to the first block of the first texture view;
   for a first sub-block of the first block of the first texture view, locating, in a second texture view, a first predictive block using the first disparity vector determined for the first block of the first texture view;
   for a second sub-block of the first block, locating, in the second texture view, a second predictive block using the first disparity vector determined for the first block of the first texture view;
   based on the first predictive block and the second predictive block, decoding the first block of the first texture view; and
   outputting a picture of decoded video data comprising the first block of the first texture view.

2. The method of claim 1, further comprising:
   determining a second block of the first texture view is to be decoded using a mode selected from the group consisting of a skip mode, a direct mode, a merge mode, and an inter-prediction mode;
   locating, in the depth view, a second depth block that corresponds to the second block of the first texture view;
   determining depth values of two or more corner positions of the second depth block, wherein the two or more corner positions of the second depth block comprise the same two or more corner positions of the first depth block.

3. The method of claim 1, wherein the first texture view comprises a non-base texture view and wherein the second texture view comprises a base texture view.

4. The method of claim 1, wherein the first block of the first texture view comprises a K×K block and wherein the first depth block that corresponds to the block of the first texture view comprises one of a K/2×K/2 block or a K×K block.

5. The method of claim 1, wherein the first block of the first texture view is encoded according to the 3D-AVC video coding standard, and the second texture view is encoded according to the H.264/AVC video coding standard.

6. The method of claim 5, wherein the first block of the first texture view is contained within a macroblock partition.

7. The method of claim 1, wherein the first block is encoded according to the 3D-high-efficiency video coding (HEVC) standard; and the second texture view is encoded according to the HEVC standard.

8. The method of claim 7, wherein the first block of the first texture view is contained within a prediction unit.

9. The method of claim 1, wherein determining the first disparity vector for the first block of the first texture view based on the depth values of the two or more corner positions of the first depth block that is collocated relative to the first block of the first texture view comprises determining a maximum depth value from the depth values of two or more corner positions of the first depth block.

10. The method of claim 1, wherein determining if the first block of the first texture view is to be decoded using the block-based view synthesis mode comprises receiving a syntax element, wherein the syntax element indicates the first block of the first texture view is to be decoded using the block-based view synthesis mode.

11. A device for decoding three-dimensional (3D) video data, the device comprising:
a memory configured to store video data; and
one or more processors configured to:
determine a first block of a first texture view is to be decoded using a block-based view synthesis mode;
determine a first disparity vector for the first block of the first texture view based on depth values of two or more corner positions of a first depth block that is collocated relative to the first block of the first texture view;
for a first sub-block of the first block of the first texture view, locate, in a second texture view, a first predictive block using the first disparity vector determined for the first block of the first texture view;
for a second sub-block of the first block, locate, in the second texture view, a second predictive block using the first disparity vector determined for the first block of the first texture view;
based on the first predictive block and the second predictive block, decode the first block of the first texture view; and
output a picture of decoded video data comprising the first block of the first texture view.

12. The device of claim 11, wherein the one or more processors are further configured to determine a second block of the first texture view is to be decoded using a mode selected from the group consisting of a skip mode, a direct mode, a merge mode, and an inter-prediction mode; locate, in the depth view, a second depth block that corresponds to the second block of the first texture view; and, determine depth values of two or more corner positions of the second depth block, wherein the two or more corner positions of the second depth block comprise the same two or more corner positions of the first depth block.

13. The device of claim 11, wherein the first texture view comprises a non-base texture view and wherein the second texture view comprises a base texture view.

14. The device of claim 11, wherein the first block of the first texture view comprises a K×K block and wherein the first depth block that corresponds to the block of the first texture view comprises one of a K/2×K/2 block or a K×K block.

15. The device of claim 11, wherein the first block of the first texture view is contained within a macroblock partition.

16. The device of claim 11, wherein the first block of the first texture view is contained within a prediction unit.

17. The device of claim 11, wherein to determine the first disparity vector for the first block of the first texture view based on the depth values of the two or more corner positions of the first depth block that is collocated relative to the first block of the first texture view, the one or more processors are configured to determine a maximum depth value from the depth values of two or more corner positions of the depth block.

18. The device of claim 11, wherein the one or more processors are further configured to determine if the first block of the first texture view is to be decoded using the block-based view synthesis mode by receiving a syntax element, wherein the syntax element indicates the first block of the first texture view is to be decoded using the block-based view synthesis mode.

19. A device for decoding three-dimensional (3D) video data, the device comprising:
means for determining a first block of a first texture view is to be decoded using a block-based view synthesis mode;
means for determining a first disparity vector for the first block of the first texture view based on depth values of two or more corner positions of a first depth block that is collocated relative to the first block of the first texture view;
for a first sub-block of the first block of the first texture view, means for locating, in a second texture view, a first predictive block using the first disparity vector determined for the first block of the first texture view;
for a second sub-block of the first block, means for locating, in the second texture view, a second predictive block using the first disparity vector determined for the first block of the first texture view;
means for decoding the first block of the first texture view based on the first predictive block and the second predictive block; and
means for outputting a picture of decoded video data comprising the first block of the first texture view.

20. The device of claim 19, further comprising:
means for determining a second block of the first texture view is to be decoded using a mode selected from the group consisting of a skip mode, a direct mode, a merge mode, and an inter-prediction mode;
means for locating, in the depth view, a second depth block that corresponds to the second block of the first texture view;
means for determining depth values of two or more corner positions of the second depth block, wherein the two or more corner positions of the second depth block comprise the same two or more corner positions of the first depth block.

21. The device of claim 20, wherein the first texture view comprises a non-base texture view and wherein the second texture view comprises a base texture view.

22. The device of claim 20, wherein the first block of the first texture view is encoded according to the 3D-AVC video coding standard, and the second texture view is encoded according to the H.264/AVC video coding standard, and wherein the first block of the first texture view is contained within a macroblock partition.

23. The device of claim 20, wherein the means for determining the first disparity vector for the first block of the first texture view based on the depth values of the two or more corner positions of the first depth block that is collocated relative to the first block of the first texture view comprises means for determining a maximum depth value from the depth values of two or more corner positions of the depth block.

24. A non-transitory computer-readable storage medium storing instructions that when executed by one or more processors cause the one or more processors to:
determine a first block of a first texture view is to be decoded using a block-based view synthesis mode;
determine a first disparity vector for the first block of the first texture view based on depth values of two or more corner positions of a first depth block that is collocated relative to the first block of the first texture view;
for a first sub-block of the first block of the first texture view, locate, in a second texture view, a first predictive block using the first disparity vector determined for the first block of the first texture view;

for a second sub-block of the first block, locate, in the second texture view, a second predictive block using the first disparity vector determined for the first block of the first texture view;

based on the first predictive block and the second predictive block, decode the first block of the first texture view; and output a picture of decoded video data comprising the first block of the first texture view.

25. The method of claim 1, further comprising: receiving the 3D video data at a receiver of a wireless communication device; storing the 3D video data on a memory of the wireless communication device; and processing the 3D video data on one or more processors of the wireless communication device.

26. The method of claim 25, wherein the wireless communication device comprises a telephone handset and wherein receiving the 3D video data at the receiver of the wireless communication device comprises demodulating, according to a wireless communication standard, a signal comprising the 3D video data.

27. The device of claim 11, wherein the device comprises a wireless communication device, further comprising a receiver configured to receive the 3D video data.

28. The device of claim 27, wherein the wireless communication device comprises a telephone handset and wherein the receiver is configured to demodulate, according to a wireless communication standard, a signal comprising the 3D video data.

* * * * *